US012669138B2

(12) United States Patent
Lafitte-Houssat et al.

(10) Patent No.: US 12,669,138 B2
(45) Date of Patent: Jun. 30, 2026

(54) SYSTEMS AND METHODS FOR PROCESSING ULTRASONIC SIGNALS TO DETECT THE POSITION OF A PISTON

(71) Applicant: Schlumberger Technology Corporation, Sugar Land, TX (US)

(72) Inventors: Eloise Lafitte-Houssat, Clamart (FR); Remi Didier Robutel, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/738,150

(22) Filed: Jun. 10, 2024

(65) Prior Publication Data

US 2025/0376997 A1 Dec. 11, 2025

(51) Int. Cl.
*F15B 15/28* (2006.01)

(52) U.S. Cl.
CPC ................................ *F15B 15/2884* (2013.01)

(58) Field of Classification Search
None
See application file for complete search history.

(56) References Cited

U.S. PATENT DOCUMENTS 4,543,649 A * 9/1985 Head .................... G01S 7/52006 367/902
5,104,144 A * 4/1992 Bethell ............ B60G 17/01933 188/284
11,078,937 B2 * 8/2021 Vijay ...................... G01K 11/24
2020/0378817 A1 * 12/2020 Vijay .................. F15B 15/2884

* cited by examiner

*Primary Examiner* — Michael Quandt
(74) *Attorney, Agent, or Firm* — Jeffrey D. Frantz

(57) ABSTRACT

A position detection system comprising a hydraulic actuator including a cylinder and piston adapted to move within the cylinder; an ultrasonic transducer adapted to detect an ultrasonic signal indicative of a position of the piston within the cylinder; and a controller. The controller is adapted to receive the ultrasonic signal from the ultrasonic transducer, implement a cross-correlation function to identify a first echo and a second echo in the ultrasonic signal, determine a velocity of first echo and the second echo, and determine the position of the piston within the cylinder in response to determining that the difference between the velocity of the first echo and the second echo and a theoretical velocity is less than a threshold.

20 Claims, 12 Drawing Sheets

SYSTEMS AND METHODS FOR PROCESSING ULTRASONIC SIGNALS TO DETECT THE POSITION OF A PISTON

FIELD

The present disclosure relates to signal processing, and more specifically, processing ultrasonic signals to detect the position of a piston.

BACKGROUND

Oil wells include downhole pumps that are used to lift crude oil from an underground reservoir to the surface. Oftentimes, before an oil well is commissioned to begin producing oil, one or more pre-production tests for characterizing the oil well are performed. In some examples, pre-production tests can be performed using one or more components, such as an actuator, included in the downhole pump.

For example, in one type of pre-production test, an actuator of the downhole pump can be pressurized in a series of pressurization steps such that a piston in the actuator moves from an original position to a test portion. Then, the actuator is subsequently depressurized such that the piston returns from the test position to the original position. The speed at which the piston returns to the original position and/or the amount of time it takes for the piston to return to the original position can be indicative of the amount of oil in an underground reservoir that can be extracted by the well. Thus, detecting and/or determining the position of the piston during a pre-production test can be useful for forecasting the production potential of an oil well.

Various approaches to detecting the position of a piston included in an actuator have been developed. In one approach in which an electromechanical actuator is implemented in a downhole pump, the position of the piston can be determined based on the relationships between known dimensions of the mechanical components and the motor that drive the actuator. For example, the position of the piston in an electromechanical actuator can be inferred from the turn count of a mechanical shaft and/or the turn count of the motor included in the electromechanical actuator. Although this approach for detecting the position of a piston in an electromechanical actuator can be very accurate, the mechanical assemblies included in electromechanical actuators can be quite long and heavy. Thus, at least one drawback to this approach is that electromechanical actuators take up a lot of space, thereby increasing the footprint of an oil well.

In another approach in which a hydraulic actuator is implemented in a downhole pump, the position of the piston within the cylinder can be inferred from a turn count of the hydraulic pump included in the hydraulic actuator. When compared to the electromechanical actuators described above, hydraulic actuators do not include long and heavy mechanical assemblies that take up a lot of space. However, at least one drawback to this approach is that detecting the position of a piston based on the turn count of a hydraulic pump can be quite inaccurate.

As the foregoing illustrates, what is needed in the art are more effective techniques for detecting the position of a piston.

SUMMARY

In one independent aspect, a position detection system comprising a hydraulic actuator including a cylinder and a piston adapted to move linearly within the cylinder, the piston having a first surface and a second surface that is displaced from the first surface by a known distance; an ultrasonic transducer adapted to detect an ultrasonic signal indicative of a position of the piston within the cylinder; and a controller coupled to the ultrasonic transducer. The controller is adapted to receive the ultrasonic signal from the ultrasonic transducer; implement a cross-correlation function to identify a first echo and a second echo in the ultrasonic signal; determine a velocity of first echo and the second echo; determine whether a difference between the velocity of the first echo and the second echo and a theoretical velocity is less than a threshold; and in response to determining that the difference between the velocity of the first echo and the second echo and a theoretical velocity is less than a threshold, determine the position of the piston within the cylinder based in part on the known distance.

In another independent aspect, a method for detecting the position of a piston within a cylinder of a hydraulic actuator. The method comprises receiving, from an ultrasonic transducer, an ultrasonic signal indicative of the position of the piston within the cylinder; implementing a cross-correlation function to identify a first echo and a second echo in the ultrasonic signal; determining a velocity of the first echo or the second echo; determining whether a difference between the velocity of the first echo or the second echo and a theoretical velocity is less than a threshold; and in response to determining that the difference between the velocity of the first echo or the second echo and a theoretical velocity is less than a threshold, determining the position of the piston within the cylinder based in part on a time shift between the first echo and the second echo in the ultrasonic signal.

In another independent aspect, a hydraulic actuator comprising a cylinder having a base portion; a piston adapted to move within an interior of the cylinder, the piston having a first surface and a second surface that is indented relative to the first surface by a known distance; an ultrasonic transducer disposed on the base portion and adapted to detect an ultrasonic signal indicative of a position of the piston within the cylinder; and a controller coupled to the ultrasonic transducer. The controller is adapted to receive the ultrasonic signal from the ultrasonic transducer; implement a cross-correlation function to identify a first echo and a second echo in the ultrasonic signal; determine a velocity of first echo and the second echo; determine whether a difference between the velocity of the first echo and the second echo and a theoretical velocity is less than a threshold; and in response to determining that the difference between the velocity of the first echo and the second echo and a theoretical velocity is less than a threshold, determine a distance between the base portion and the first surface of the piston independent of a pressure or a temperature within the interior of the cylinder.

Other aspects will become apparent by consideration of the detailed description and accompanying drawings.

At least one technical advantage of the disclosed techniques relative to conventional approaches is that a hydraulic actuator can be used in place of an electromechanical actuator. In that regard, the hydraulic actuator implemented with the disclosed techniques takes up less space, thereby reducing the size and weight of the actuator in an installation such as an oil well. At least another technical advantage of the disclosed techniques relative to conventional approaches is that position of a piston within a cylinder can be determined using an ultrasonic sensor independent of the pressure and/or temperature conditions within the cylinder. In that regard, changing pressure and temperature conditions within the cylinder do not reduce the accuracy of piston position that is detected with the disclosed techniques.

DETAILED DESCRIPTION

Figure 1:
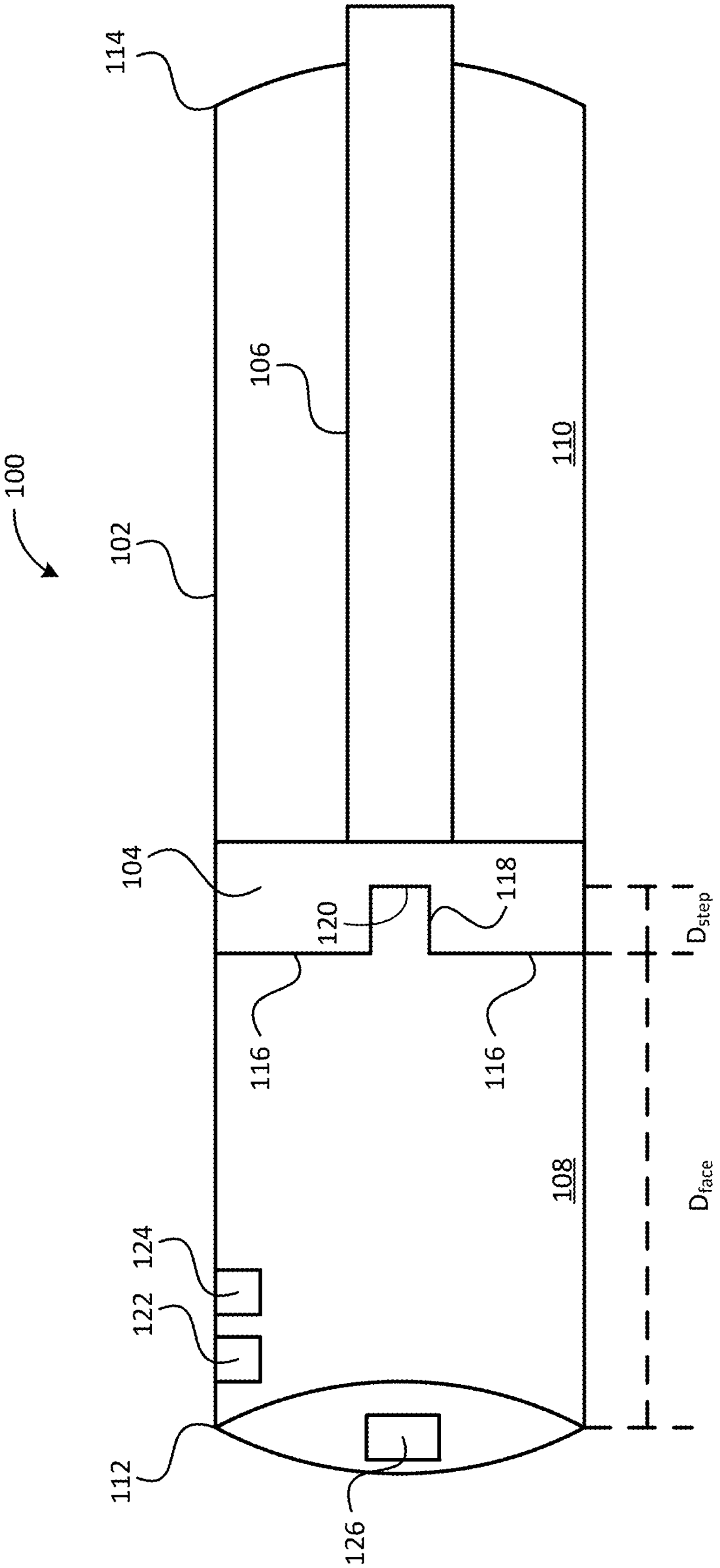
FIG. 1 illustrates a side cross-section view of a hydraulic actuator, according to aspects of the various embodiments.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more electronic processors, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more electronic processors, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4." The relative terminology may refer to plus or minus a percentage (e.g., 1%, 5%, 10%, or more) of an indicated value.

Functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not explicitly listed.

FIG. 1 illustrates a side cross-section view of a hydraulic actuator 100, according to aspects of the various embodiments. The hydraulic actuator 100 may be implemented, for example, in conjunction with a downhole pump included in an oil well. The hydraulic actuator 100 includes, among other things, a cylinder 102, a piston 104, and a piston rod 106 coupled to the piston 104. The piston 104 divides the interior of the cylinder 102 into a first chamber 108 of hydraulic fluid and a second chamber 110. When hydraulic fluid is pumped into one of the chambers 108, 110, the piston 104 is caused to move linearly (e.g., extend or retract) within the cylinder 102. For example, the piston 104 may extend towards the base 112 of the cylinder 102 and/or retract towards the head 114 of the cylinder 102. As the piston 104 moves within the cylinder 102, corresponding movement of the piston rod 106 can be used to move loads or perform mechanical work.

A first surface of the piston 104, or piston face, 116 is oriented to face in the direction of the base 112 of the cylinder 102. As described herein, the position of the piston 104 within the cylinder 102 corresponds to a distance from the base 112 of the cylinder 102 to the piston face 116. In the illustrated example of FIG. 1, the distance from the base 112 of the cylinder 102 to the piston face 116 is denoted as $D_{face}$. As further shown in FIG. 1, an indent, or step, 118 is formed in the piston face 116. The step 118 defines a second surface of the piston 104, or step face 120, that is oriented to face in the direction of the base 112 of the cylinder 102. The step face 120 is displaced from the piston face 116 by a constant, or known, distance $D_{step}$. In that regard, the distance from the base 112 of the cylinder 102 to the step face 120 is equal to the sum of the distance $D_{face}$ from the base 112 to the piston face 116 and the known distance $D_{step}$ from the piston face 116 to the step face 120. In some examples, the distance $D_{step}$ is less than 10 millimeters (mm). In some examples, the distance $D_{step}$ is between 10 and 20 mm (e.g., 13 mm, 15 mm, etc.). In some examples, the distance $D_{step}$ is greater than 20 mm.

In the illustrated example of FIG. 1, the piston face 116 and the step face 120 are shown to be flat surfaces. However, as will be described in more detail herein, in some examples, the piston face 116 and/or the step face 120 can be curved surfaces. In some examples, the piston face 116 and/or the step face 120 are curved in two dimensions. In some examples, the piston face 116 and/or the step face 120 are spherical, or curved in three dimensions. When compared to a flat surface, a piston face 116 and/or a step face 120 that is curved can increase the reflective energy of signals reflected off the curved piston face 116 and/or the curved step face 120. In some examples, the radius of curvature of the piston face 116 and/or the step face 120 is between 70 mm and 120 mm.

In some examples, one or more sensors can be coupled to and/or disposed within the hydraulic actuator 100 for measuring one or more characteristics of the hydraulic actuator 100. For example, one or more pressure sensors 122 can be disposed within the first chamber 108 and/or placed in fluid communication with the first chamber 108 to measure the pressure of the hydraulic fluid in the first chamber 108. As example, one or more temperature sensors 124 can be disposed within the first chamber 108 and/or placed in fluid communication with the first chamber 108 to measure the temperature of the hydraulic fluid in the first chamber 108.

As further shown in the illustrated example of FIG. 1, an ultrasonic transducer 126 can be coupled to and/or disposed on the base 112 of the cylinder 102. As will be described in more detail herein, the ultrasonic transducer 126 can be used to detect the position of the piston 104 within the cylinder 102 (e.g., detect the distance $D_{face}$ from the base 112 of the cylinder 102 to the piston face 116). Although only one ultrasonic transducer 126 is shown in the illustrated example of FIG. 1, persons skilled in the art should understand that in some examples, more than one ultrasonic transducer 126 can be coupled to and/or disposed on the base 112 of the cylinder 102.

In operation, the ultrasonic transducer 126 generates an ultrasonic signal. As described herein, generating an ultrasonic signal includes emitting, by the ultrasonic transducer 126, an ultrasonic pulse in the direction of the piston face 116 and receiving, by the ultrasonic transducer 126, one or more reflections, or echoes, of the ultrasonic pulse emitted in the direction of the piston face 116. The one or more echoes of the ultrasonic pulse emitted by the ultrasonic transducer 126 can include, for example, a first echo of the ultrasonic pulse that was reflected off the piston face 116 back towards the ultrasonic transducer 126 and a second echo of the ultrasonic pulse that was reflected off the step face 120 back towards the ultrasonic transducer 126. In some examples, the one or more echoes of the ultrasonic pulse emitted by the ultrasonic transducer 126 can further include one or more parasitic reflections of the ultrasonic pulse off surfaces other than the piston face 116 or step face 120 (e.g., reflections off side surfaces of the cylinder 102).

As will be described in more detail herein, an ultrasonic signal generated by the ultrasonic transducer 126 can be analyzed to identify, within the ultrasonic signal, the first echo reflected off the piston face 116 and/or the second echo reflected off the step face 120. Then, based on the known distance $D_{step}$ between the piston face 116 and the step face 120, the identified first echo reflected off the piston face 116, and the identified second echo reflected off the step face 120, the position of the piston 104 within the cylinder 102 can be determined (e.g., the distance $D_{face}$ from the base 112 of the cylinder 102 to the piston face 116).

Figure 2A:
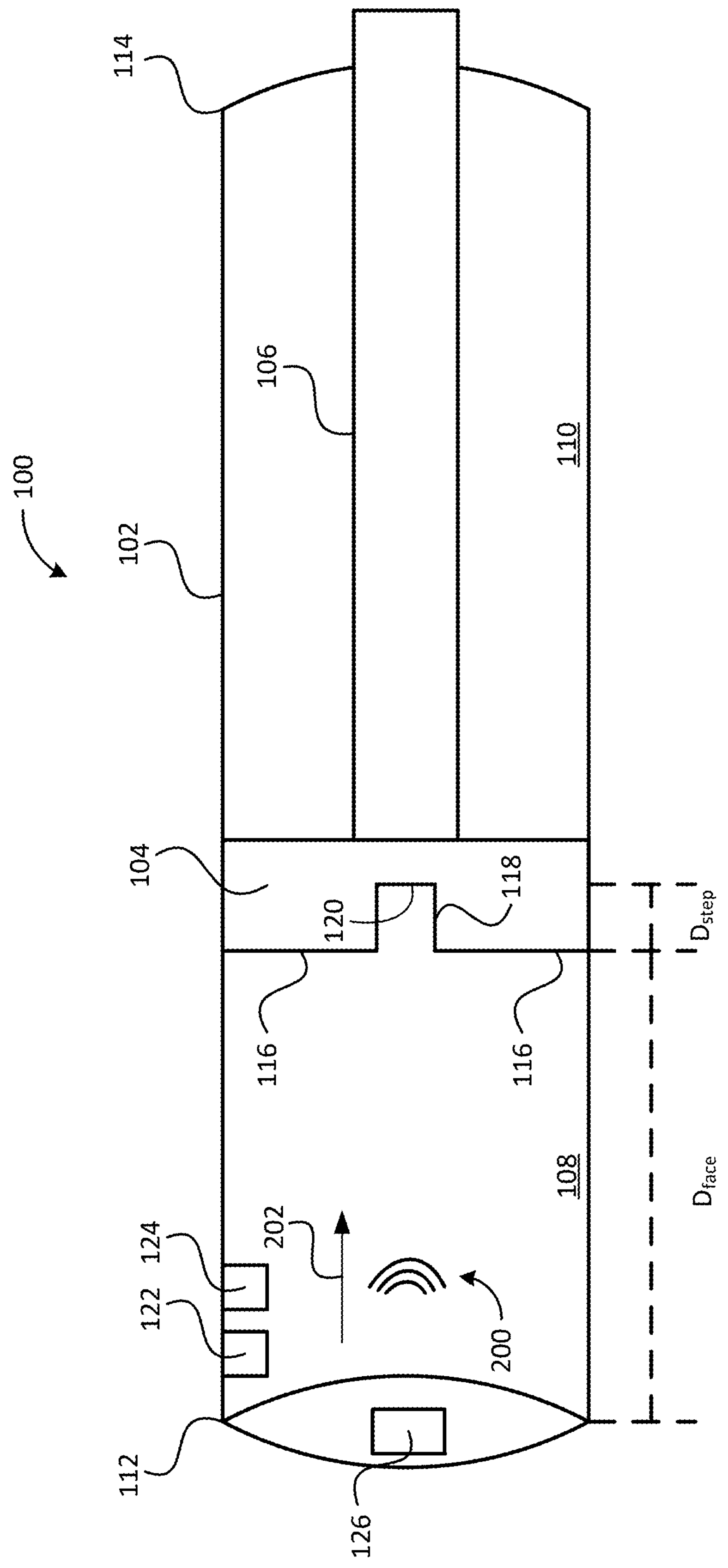
FIG. 2A illustrates an example ultrasonic pulse propagating through a chamber of the hydraulic actuator of FIG. 1, according to aspects of the various embodiments.

FIG. 2A illustrates an example ultrasonic pulse propagating through a chamber of the hydraulic actuator of FIG. 1, according to various embodiments. For example, as shown in FIG. 2A, an ultrasonic pulse 200 emitted by the ultrasonic transducer 126 propagates, or travels, through hydraulic fluid in the first chamber 108 of the cylinder 102 in a first direction 202 towards the piston 104. The ultrasonic pulse 200 travels in the first direction 202 until the ultrasonic pulse 200 reflects off the piston face 116 and/or the step face 120 back towards the ultrasonic transducer 126.

Figure 2B:
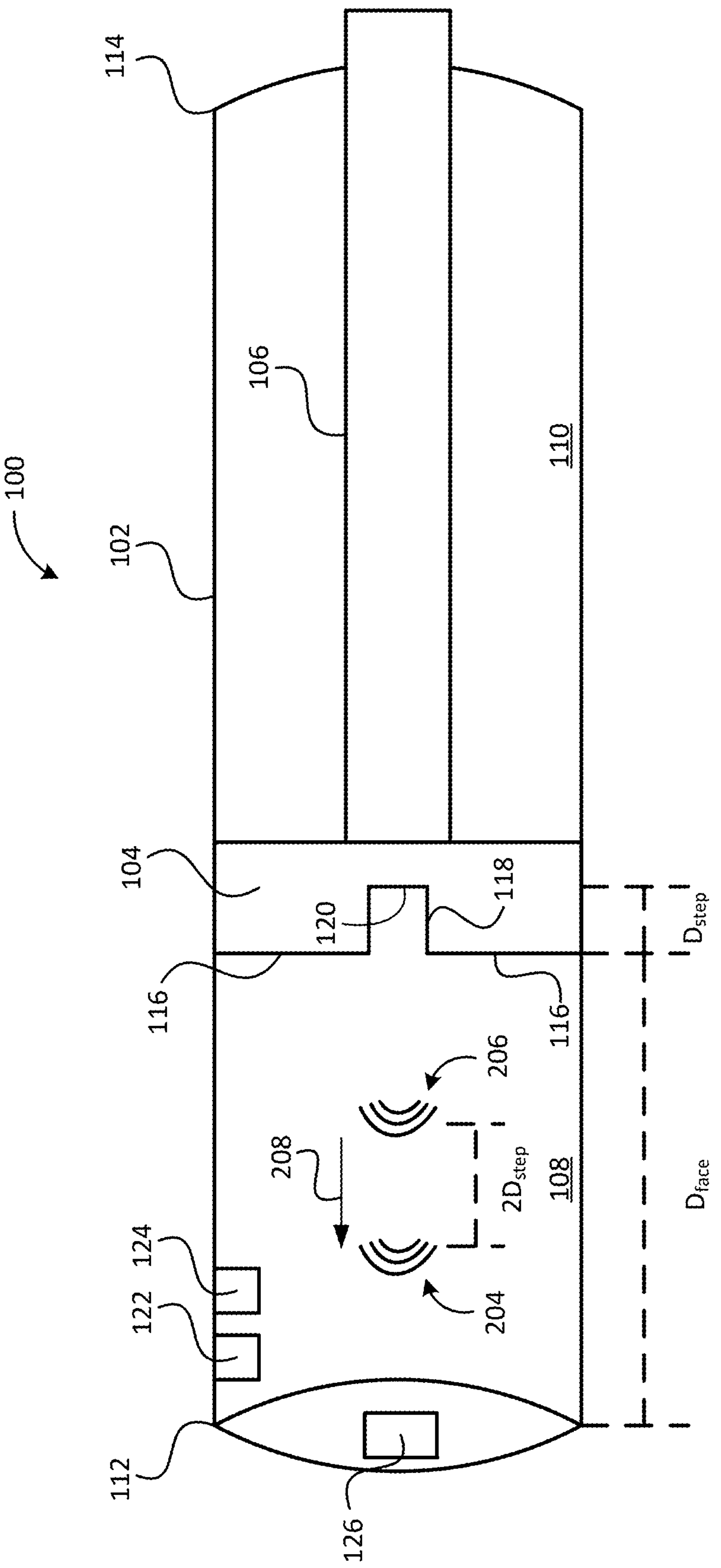
FIG. 2B illustrates first and second example echoes of the ultrasonic pulse of FIG. 2A propagating through the chamber of the hydraulic actuator of FIG. 1, according to various embodiments.

FIG. 2B illustrates first and second example echoes of the ultrasonic pulse of FIG. 2A propagating through the chamber of the hydraulic actuator of FIG. 1, according to various embodiments. For example, as shown in FIG. 2B, a first echo 204 of the ultrasonic pulse 200 and a second echo 206 of the ultrasonic pulse 200 propagate, or travel, through hydraulic fluid in the first chamber 108 of the cylinder in a second direction 208 towards the ultrasonic transducer 126 and/or the base 112 of the cylinder 102. The first echo 204 of the ultrasonic pulse 200, which can be referred to hereinafter as the first echo 204, is a reflection of the ultrasonic pulse 200 off the piston face 116 back towards the ultrasonic transducer 126. Similarly, the second echo 206 of the ultrasonic pulse 200, which can be referred to hereinafter as the second echo 206, is a reflection of the ultrasonic pulse 200 off the step face 120 back towards the ultrasonic transducer 126. In that regard, as shown in FIG. 2B, the first echo 204 and the second echo 206 are separated by a distance $2D_{step}$, which is equal to twice the known distance D step between the piston face 116 and the step face 120.

The first echo 204 and the second echo 206 travel in the second direction 208 towards the ultrasonic transducer 126 and/or base 112 such that the first and second echoes 204, 206 are received, or detected, by the ultrasonic transducer 126. The time delay between the time at which the first echo 204 is detected by the ultrasonic transducer 126 and the second echo 206 is detected by the ultrasonic transducer 126 is a function of the velocity of the echoes 204, 206 and the known distance $D_{step}$ between the piston face 116 and the step face 120. As will be described in more detail herein, the first echo 204 and the second echo 206 can be included an ultrasonic signal generated by the ultrasonic transducer 126. In that regard, a processing device that is processing, or analyzing, the ultrasonic signal generated by the ultrasonic transducer 126 can identify the first and second echoes 204, 206 within the ultrasonic signal. Moreover, the processing device can further determine a position of the piston 104 within the cylinder 102 based in part on the first and second echoes 204, 206 identified within the ultrasonic signal.

However, in some instances, one or more parasitic echoes of the ultrasonic pulse 200 propagating through the hydraulic fluid in the first chamber 108 can be received, or detected, by the ultrasonic transducer 126 and mistaken for the first echo 204 and/or the second echo 206. In such instances, if the position of the piston 104 is determined based on a parasitic echo that was incorrectly identified the first echo 204 or the second echo 206, the determined position of the piston 104 can be inaccurate. In that regard, as will be described in more detail herein, with the disclosed techniques, an ultrasonic signal generated by the ultrasonic transducer 126 can be processed to filter out parasitic echoes from the ultrasonic signal and/or prevent using a parasitic echo to determine a position of the piston 104 within the cylinder 102.

Figure 2C:
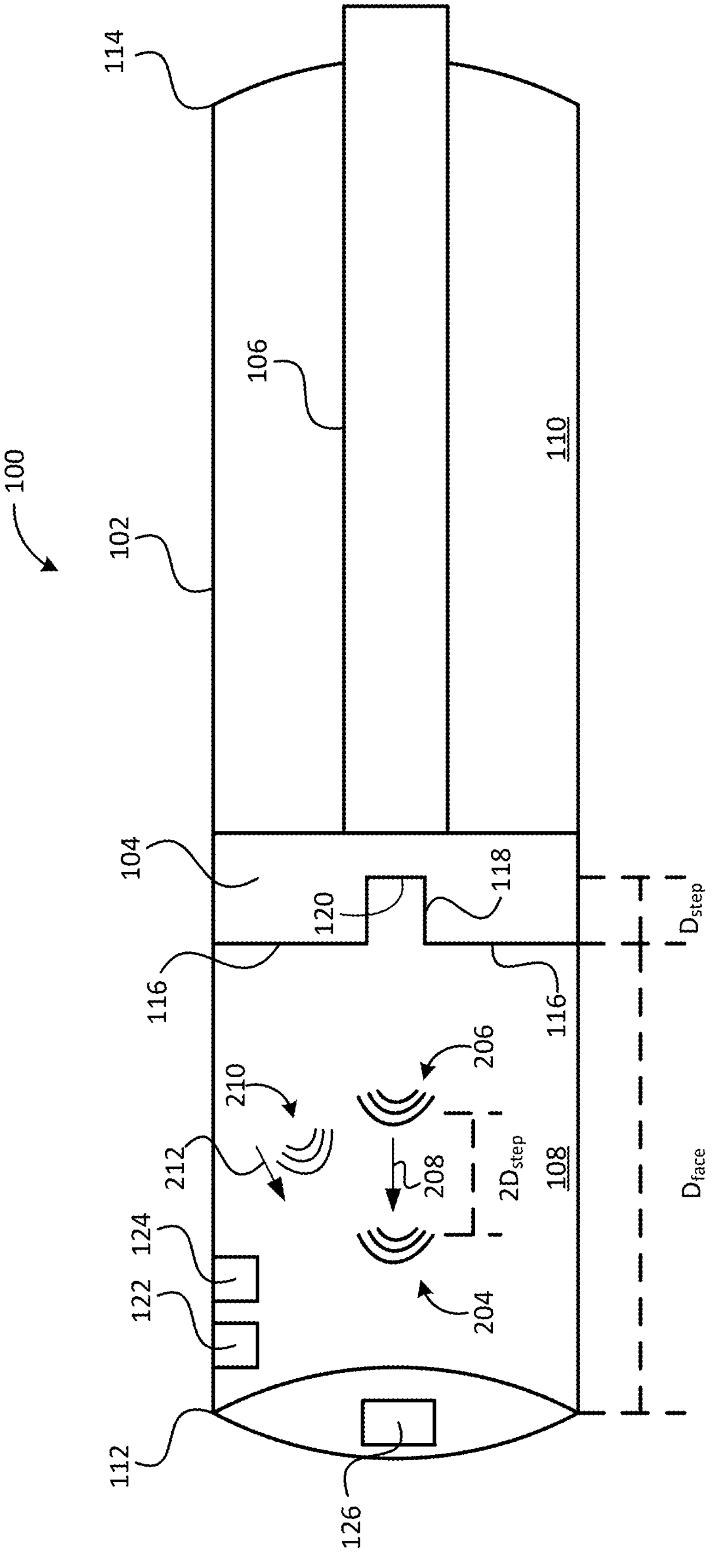
FIG. 2C illustrates an example parasitic echo of the ultrasonic pulse of FIG. 2A propagating through the chamber of the hydraulic actuator of FIG. 1, according to various embodiments.

FIG. 2C illustrates an example parasitic echo of the ultrasonic pulse of FIG. 2A propagating through the chamber of the hydraulic actuator of FIG. 1, according to various embodiments. For example, as shown in FIG. 2C, a parasitic echo 210 of the ultrasonic pulse 200 propagates, or travels, through hydraulic fluid in the first chamber 108 of the cylinder in a third direction 212 towards the ultrasonic transducer 126. The parasitic echo 210 of the ultrasonic pulse 200, which can be referred to hereinafter as parasitic echo 210, is a reflection of the ultrasonic pulse 200 off a side surface of the cylinder 102 back towards the ultrasonic transducer 126. In that regard, as the parasitic echo 210 is not a reflection of the ultrasonic pulse 200 off a surface of the piston 104 (e.g., the piston face 116 or the step face 120), the ultrasonic pulse 200 is not indicative of a position of the piston 104 and cannot be used to accurately determine a position of the piston 104.

The parasitic echo 210 travels in the third direction 212 until the parasitic echo 210 is received, or detected, by the ultrasonic transducer 126. As will be described in more detail herein, the parasitic echo 210 can be included an ultrasonic signal generated by the ultrasonic transducer 126. In that regard, a processing device that is processing, or analyzing, the ultrasonic signal generated by the ultrasonic transducer 126 may mistake the parasitic echo 210 in the ultrasonic signal for the first echo 204 or the second echo 206 and use the parasitic echo 210 to inaccurately determine a position of the piston 104 within the cylinder 102. Accordingly, as will be described in more detail herein, one or more post processing techniques can be applied to the ultrasonic signal generated by the ultrasonic transducer 126 to avoid misidentifying the parasitic echo 210 as the first or second echo 204, 206 and inaccurately determining a position of the piston 104. Although the parasitic echo 210 is shown in the illustrated example of FIG. 2C as a single parasitic echo, persons skilled in the art will understand that in some examples, more than one parasitic echo of the ultrasonic pulse 200 travelling through the first chamber 108 can be received, or detected, by the ultrasonic transducer 126.

Figure 3:
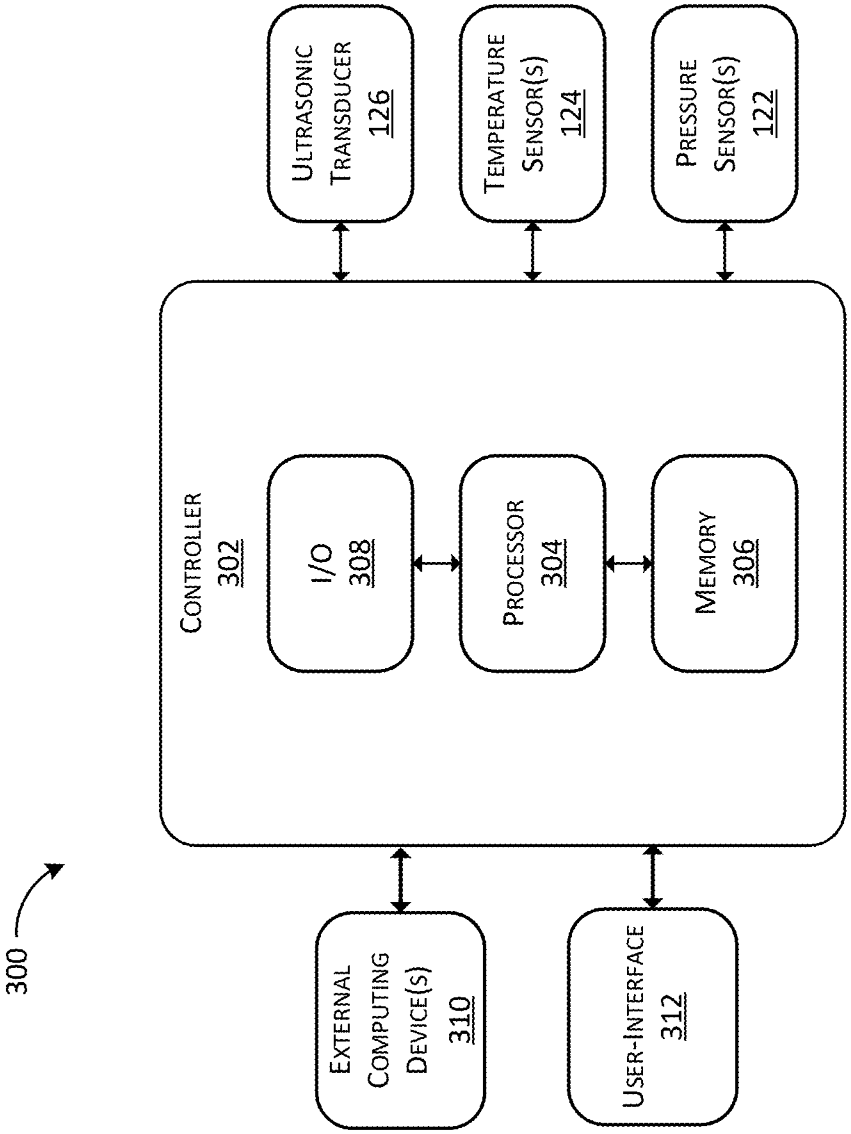
FIG. 3 is a block diagram of a position detection system, according to various embodiments.

FIG. 3 is a block diagram of a position detection system 300, according to various embodiments. The position detection system 300 can determine, for example, the position of the piston 104 within the cylinder 102 of hydraulic actuator 100. As shown, the position detection system 300 includes a controller 302 that is coupled to and/or controls operation of various components included in the position detection system 300. The controller 302 can be coupled to the components included in the position detection system 300 using one or more wired connections and/or one or more wireless connections. In the illustrated example of FIG. 3, the controller 302 includes a processor 304 (e.g., a microprocessor, a microcontroller, or another suitable programmable device), a memory 306, and an input/output ("I/O") system 308 that are interconnected by a bus. In some examples, the controller 302 can be implemented as a computing device such as, but not limited to, a laptop computer, a smartphone, a desktop computer, a server, a tablet, cloud-based computing device, or some other suitable type of computing device.

The I/O system 308 includes routines for transferring information between components within the controller 302 and other components of the position detection system 300. In some examples, the I/O system 308 includes a communication interface that is configured to provide communication between the controller 302 and one or more external computing devices 310 (e.g., a smart phone, a tablet, a laptop, etc.). In some examples, the I/O system 308 enables the controller 302 to communicate with external computing devices 310 associated with operators of the oil well in which the hydraulic actuator 100 is implemented. In such examples, the controller 302 communicates with the one or more communication devices 310 through a network. The network is, for example, a wide area network (WAN) (e.g., the Internet, a TCP/IP based network, a cellular network, such as, for example, a Global System for Mobile Communications [GSM] network, a General Packet Radio Services [GPRS] network, a Code Division Multiple Access [CDMA] network, an Evolution-Data Optimized [EV-DO] network, an Enhanced Data Rates for GSM Evolution [EDGE] network, a 3 GSM network, a 4GSM network, a Digital Enhanced Cordless Telecommunications [DECT] network, a Digital AMPS [IS-136/TDMA] network, or an Integrated Digital Enhanced Network [iDEN] network, etc.). In other examples, the network is, for example, a local area network (LAN), a neighborhood area network (NAN), a home area network (HAN), or personal area network (PAN) employing any of a variety of communications protocols, such as Wi-Fi, Bluetooth, ZigBee, etc. In some examples, the network includes one or more of a wide area network (WAN), a local area network (LAN), a neighborhood area network (NAN), a home area network (HAN), or personal area network (PAN).

The memory 306 includes, for example, a read-only memory ("ROM"), a random access memory ("RAM"), an electrically erasable programmable read-only memory ("EEPROM"), a flash memory, a hard disk, an SD card, or another suitable magnetic, optical, physical, or electronic memory device. The memory 306 stores software, such as but not limited to firmware, one or more applications, program data, one or more program modules, and/or other executable instructions, for detecting the position of the piston 104 within the cylinder 102 of hydraulic actuator 100. Stated another way, the memory 306 stores software, such as but not limited to firmware, one or more applications, program data, one or more program modules, and/or other executable instructions, for determining the distance $D_{face}$ from the base 112 of the cylinder 102 to the piston face 116. In some examples, the memory 306 stores one or more parameters of the piston 104 and/or the ultrasonic transducer 126. For example, the memory 306 can store the value of the known distance $D_{step}$ from the piston face 116 to the step face 120. In some examples, the memory 306 stores one or more manufacturing parameters Q (e.g., quality factor(s)) of the hydraulic actuator 100 and/or the ultrasonic transducer 126. In some examples, the memory 306 stores a value of the resonance frequency $f_{res}$ of the ultrasonic transducer 126. As will be described in more detail herein, in some examples, the memory 306 stores one or more characteristics of the first echo 204 and/or the second echo 206 that were determined during an initialization step and/or a piston position tracking loop.

In operation, the processor 304 retrieves from the memory 306 and executes software instructions for detecting the position of the piston 104 within the cylinder 102 of hydraulic actuator 100. Hereinafter, functions and/or actions performed by components of the controller 302 (e.g., processor 304, memory 306, and I/O system 308) can collectively be referred to as being performed by the controller 302.

Referring back to FIG. 3, the position detection system 300 includes various components and/or systems that are coupled to and/or controlled by the controller 302. For example, the controller 302 is coupled to one or more pressure sensors 122, one or more temperature sensors 124, the ultrasonic transducer 126, one or more external computing devices 310, and a user-interface 312. In some examples, the controller 302 is coupled to one or more of the pressure sensors 122, the temperature sensors 124, and/or the ultrasonic transducer 126 via one or more wired connections. In some examples, the controller 302 is coupled to one or more of the pressure sensors 122, the temperature sensors 124, and/or the ultrasonic transducer 126 via one or more wireless connections.

In operation, the one or more pressure sensors 122 can generate and transmit signals to the controller 302 that include measurements indicative of the pressure conditions for one or more portions of the hydraulic actuator 100. For example, a pressure sensor 122 can generate and transmit signals to the controller 302 that are indicative of the pressure of hydraulic fluid in the first chamber 108 of the cylinder 102. Similarly, in operation, the one or more temperature sensors 124 can generate and transmit signals to the controller 302 that include measurements indicative of the temperature of one or more portions of the hydraulic actuator 100. For example, a temperature sensor 124 can generate and transmit signals to the controller 302 that are indicative of the temperature of hydraulic fluid within the first chamber 108 of the cylinder 102.

As described herein, the controller 302 can transmit, via the I/O system 308, one or more signals to one or more external computing devices 310. For example, the controller 302 can transmit signals indicative of the position of the piston 104 within the cylinder 102 of the hydraulic actuator 100 to one or more external computing devices 310. As another example, the controller 302 transmit signals indicative of a drawdown volume of the first chamber 108 in the cylinder 102 of the hydraulic actuator 100 to one or more external computing devices 310.

The user-interface 312 is adapted to receive input from an operator of the oil well in which the hydraulic actuator 100 is implemented and/or output information to the operator of the oil well in which the hydraulic actuator 100 is implemented. For example, the user-interface 312 can output information indicative of the position of the piston 104 within the cylinder 102 of hydraulic actuator 100. In some examples, the user-interface 312 includes a display (e.g., a primary display, a secondary display, etc.) and/or input devices (e.g., touchscreen displays, a plurality of knobs, dials, switches, buttons, levers, joysticks, etc.). The display may be, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In some examples, the user-interface 312 includes one or more audio indicators (e.g., speakers, horns, buzzers, etc.) and/or visual indicators such as LEDs.

The ultrasonic transducer 126 is adapted to generate and transmit to the controller 302 one or more ultrasonic signals indicative of the position of the piston 104 within the cylinder 102 of the hydraulic actuator 100. Hereinafter, the position of the piston 104 within the cylinder 102 of the hydraulic actuator 100 can simply be referred to as the position of the piston 104. As described herein, to generate an ultrasonic signal indicative of the position of the piston 104, the ultrasonic transducer 126 emits an ultrasonic pulse 200 in a first direction 202 towards the piston 104 and receives, or detects, a first echo 204 of the ultrasonic pulse 200 reflected off the piston face 116 and a second echo 206 of the ultrasonic pulse 200 reflected off the step face 120. In some examples, the ultrasonic signal further includes parasitic noise and/or one or more parasitic echoes 210 of the ultrasonic pulse 200. The controller 302 can then process, or analyze, an ultrasonic signal generated by the ultrasonic transducer 126 to detect the first and second echoes 204, 206 in the ultrasonic signal and determine, based in part on the identified first and second echoes 204, 206, the position of the piston 104.

In some examples, the ultrasonic transducer 126 is adapted to generate an ultrasonic signal that is an analog voltage waveform. In such examples, the controller 302 may include an analog-to-digital converter (ADC) that is adapted to convert the analog voltage waveform generated by the ultrasonic transducer 126 into a digital signal. The sampling rate (e.g., the number of samples per second) of the ADC can be designed in accordance with the central frequency of the ultrasonic transducer 126. The central frequency of the ultrasonic transducer 126, for example, refers to the resonant mode which is used to generate pressure pulses from a driving voltage applied to the ultrasonic transducer 126. A ratio between the sampling rate and the central frequency of the ultrasonic transducer 126 (e.g., sampling rate/central frequency) can be indicative of how the signal quality is digitalized. In some examples, the ratio between the sampling rate and the central frequency of the ultrasonic transducer 126 ranges between 3 and 6. In some examples, the ratio between the sampling rate and the central frequency of the ultrasonic transducer 126 can be as large as 10-20. In one example, if the ultrasonic transducer 126 is a 2 MHz transducer, the signals generated by the ultrasonic transducer 126 are processed at rates between 6 MHz to 12 MHz.

In some examples, the ultrasonic transducer 126 may include one or more piezoelectric elements adapted to emit and detect pressure waves. In such examples, the controller 302 can apply a voltage to the ultrasonic transducer 126 to excite one or more of the piezoelectric elements. When excited with a voltage, a piezoelectric element in the ultrasonic transducer 126 emits a pressure wave (e.g., the ultrasonic pulse 200) in the direction of the piston 104. Furthermore, in this example, when a reflected pressure wave (e.g., the first echo 204, the second echo 206, or a parasitic echo 210) is received, or detected, by a piezoelectric element in the ultrasonic transducer 126, the piezoelectric element converts the detected pressure wave into a voltage pulse in the ultrasonic signal generated by ultrasonic transducer 126.

Figure 4:
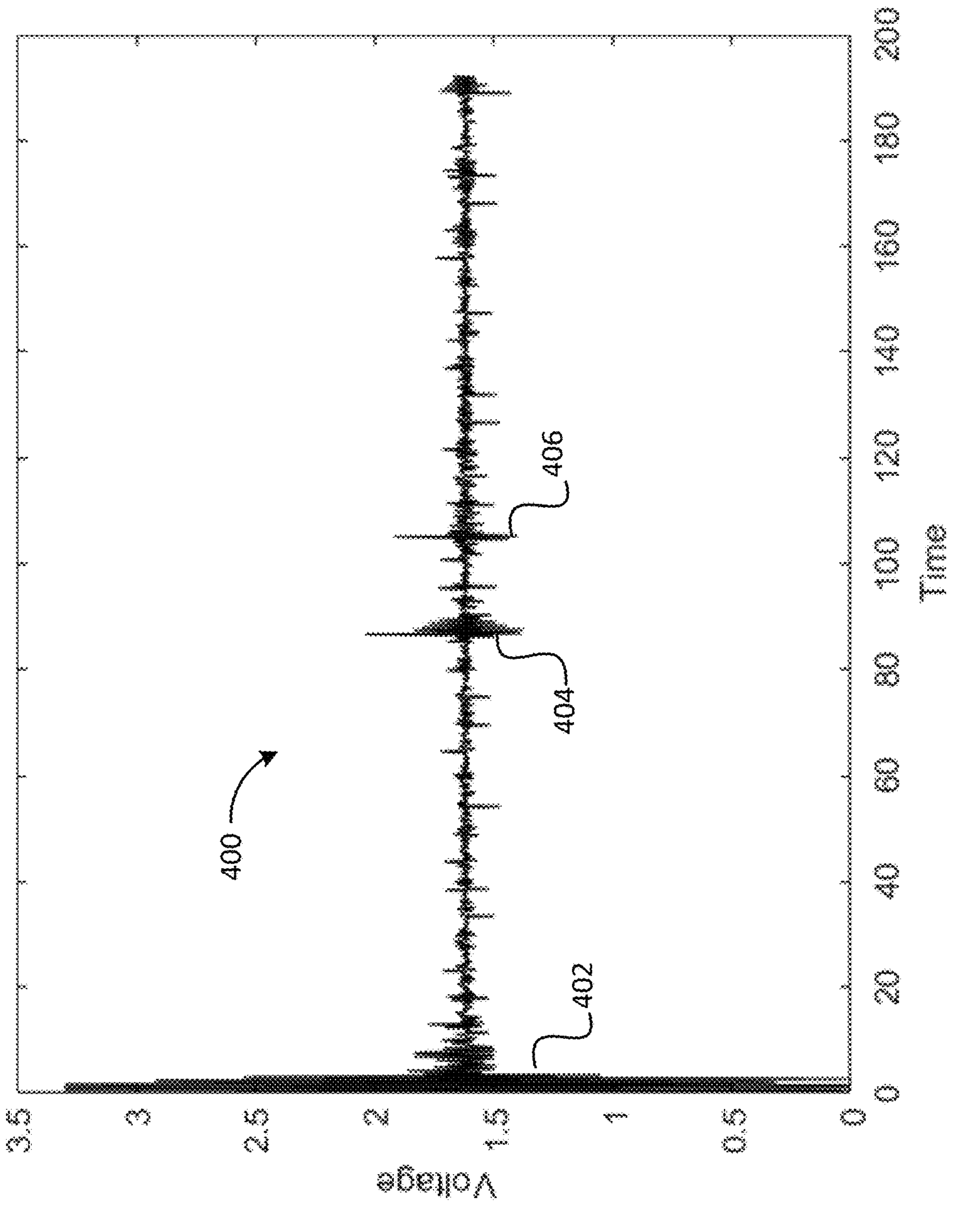
FIG. 4 illustrates an example ultrasonic signal generated by an ultrasonic transducer, according to various embodiments.

In operation, the controller 302 is adapted to control the ultrasonic transducer 126 to generate one or more ultrasonic signals indicative of the position of the piston 104. FIG. 4 illustrates an example ultrasonic signal generated by an ultrasonic transducer, according to various embodiments. For example, FIG. 4 illustrates an example ultrasonic signal 400 generated by the ultrasonic transducer 126. In the illustrated example of FIG. 4, the ultrasonic signal 400 is plotted as a waveform of voltage vs. time. As shown, the ultrasonic signal 400 includes a first pulse 402 occurring from time t=0 μs to time t=5 μs, a second pulse 404 occurring from time t=85 μs to t=90 μs, and a third pulse 406 occurring from time t=104 μs to t=108 μs. In the illustrated example of FIG. 4, the first pulse 402 corresponds to the measured voltage of the ultrasonic pulse 200 emitted by the ultrasonic transducer 126, the second pulse 404 corresponds to the measured voltage of the first echo 204 of the ultrasonic pulse 200 reflected off the piston face 116, and the third pulse 406 corresponds to the measured voltage of the second echo 206 of the ultrasonic pulse 200 reflected off the step face 120. In addition, the ultrasonic signal 400 includes various instances of parasitic signal noise occurring between the pulses 402, 404, and 406.

In operation, the controller 302 is further adapted to analyze, or process, one or more ultrasonic signals generated by the ultrasonic transducer 126 to determine the position of the piston 104 and/or the drawdown volume of the first chamber 108 in the cylinder 102 of hydraulic actuator 100. As will be described in more detail herein, the controller 302 processes an ultrasonic signal generated by the ultrasonic transduce 126 to identify, or detect, a voltage pulse that corresponds to the first echo 204 and a voltage pulse that corresponds to the second echo 206. For example, the controller 302 processes the ultrasonic signal 400 to identify, or detect, the second pulse 404 that corresponds to the measured voltage of the first echo 204 and/or the third pulse 406 that corresponds to the measured voltage of the second echo 206. Hereinafter, the controller 302 processing an ultrasonic signal to identify, or detect, a voltage pulse in an ultrasonic signal that corresponds to a received, or detected, echo can simply be referred to as processing an ultrasonic signal to identify an echo in the ultrasonic signal. In that regard, the controller 302 can process the ultrasonic signal 400 to identify the first echo 204 in the ultrasonic signal 400 and/or identify the second echo 206 in the ultrasonic signal 400.

In signal processing, cross-correlation refers to a measure of similarity between two series, or signals, as a function of the displacement of one signal relative to the other signal. In some examples, the controller 302 uses cross-correlation signal processing techniques to identify the first echo 204 in an ultrasonic signal generated by the ultrasonic transducer 126 and/or the second echo 206 in an ultrasonic signal generated by the ultrasonic transducer 126. For example, the controller 302 implements a cross-correlation function to scan the ultrasonic signal and identify one or more echoes that are suspected to be the first echo 204 or the second echo 206. While implementing the cross-correlation function, the controller 302 may compare a suspected echo to a reference signal to determine whether the suspected echo is the first echo 204 or the second echo 206. As described herein, a reference signal is a signal that includes one or more references echoes that correspond to the first echo 204 and/or the second echo 206 in an ultrasonic signal generated by the ultrasonic transducer 126.

In some examples, the controller 302 uses a generic reference signal to implement the cross-correlation function. The generic reference signal can be calculated, for example, using generic manufacturing parameters Q and/or generic resonance frequency parameters. However, depending on the type of ultrasonic transducer 126 that is used to generate the ultrasonic signal, or the type of hydraulic actuator 100 for which the ultrasonic transducer 126 is used to detect the position of the piston 104, the shapes and/or sizes of echoes can vary. Thus, using a generic reference signal to implement a cross-correlation function does not account for these variations in echo size and/or shape and can introduce an error in the cross-correlation. For example, using a generic reference signal to implement the cross-correlation function can result in the first echo 204 and/or the second echo 206 being detected at an incorrect time. As another example, using a generic reference signal to implement the cross-correlation function can result in the first echo 204 and/or the second echo 206 going undetected altogether.

Accordingly, to account for the above-described variations in echo size and/or shape between the different types of ultrasonic transducer 126 and/or hydraulic actuators 100, the controller 302 can implement a self-calibration step. During the self-calibration step, the controller 302 can generate a calibrated reference signal that is specific to the type of ultrasonic transducer 126 being used and/or the type of hydraulic actuator 100 for which the ultrasonic transducer 126 is used to detect the position of the piston 104. For example, the calibrated reference signal is calculated with parameters (e.g., manufacturing parameters Q and resonance frequency $f_{res}$) that have been extracted from a fit on a real waveform. In some examples, the calibrated reference signal can be generated using an algorithm based on manufacturing parameters Q of the cylinder 102, manufacturing parameters Q of the piston 104, manufacturing parameters Q of the ultrasonic transducer 126, a resonance frequency $f_{res}$ of the ultrasonic transducer 126, and/or a known function that describes an ultrasonic echo. Then, the controller 302 can re-implement the cross-correlation function with the calibrated reference signal to scan the ultrasonic signal and identify one or more echoes that are suspected to be the first echo 204 or the second echo 206.

In some examples, the self-calibration step is implemented as an optimization algorithm and/or as a regression algorithm. In such examples, the self-calibration step can be used to determine the minimum discrepancies between a known function, such as a time domain envelope or frequency domain envelope, and parameters such as the resonance frequency $f_{res}$ of the ultrasonic transducer 126 and/or manufacturing parameters Q of the cylinder 102, the piston 104, and/or the ultrasonic transducer 126. In some examples, the self-calibration step can be run at any time during operation of the hydraulic actuator 100. In some examples, a change in parameters and/or a range of parameters during operation of the hydraulic actuator 100 can be an indicator of proper operation or issues with the detected echoes.

In some examples, the controller 302 implements a cross-correlation function to identify the position of the first echo 204 within an ultrasonic signal generated by the ultrasonic transducer 126 and/or to identify the position of the second echo 206 within the ultrasonic signal generated by the ultrasonic transducer 126. Moreover, in some examples, the controller 302 implements a cross-correlation function to extract the time of flight of the first echo 204 from the piston face 116 to the ultrasonic transducer 126 from an ultrasonic signal and/or to extract the time of flight of the second echo 206 from the step face 120 to the ultrasonic transducer 126 from an ultrasonic signal. Furthermore, in some examples, the controller 302 implements a cross-correlation function to extract a time shift between the first echo 204 in the ultrasonic signal and the second signal 206 in an ultrasonic signal generated by the ultrasonic transducer 126.

In some examples, implementing a cross-correlation function includes calculating, or determining, the cross-correlation between an ultrasonic signal and a reference signal in the frequency domain. Using Equation 1 below, the controller 302 can determine the cross-correlation $CC_{fd}$ between an ultrasonic signal generated by the ultrasonic transducer 126 and a reference signal in the frequency domain based on a Fast Fourier Transform (FFT) of the ultrasonic signal $FFT_{ultra}$ and an FFT of the reference signal $FFT_{reference}$.

$$CC_{fd}=2*FFT_{ultra}*FFT_{reference}^{T} \quad \text{Equation 1}$$

In some examples, implementing a cross-correlation function includes calculating, or determining, a cross-correlation analytic signal for the cross-correlation between the ultrasonic signal and the reference signal. Using Equation 2 below, the controller 302 can determine the cross-correlation analytic signal $CC_{as}$ based on an inverse zero-frequency shift iFFTshift of the inverse FFT iFFT of the cross-correlation $CC_{fd}$ between the ultrasonic signal and the reference signal in the frequency domain.

$$CC_{as}=\text{iFFTshift}(\text{iFFT}(CC_{fd})) \quad \text{Equation 2}$$

In some examples, implementing a cross-correlation function includes calculating, or determining, a cross-correlation envelope for the cross-correlation between the ultrasonic signal and the reference signal. Using Equation 3 below, the controller 302 can determine the cross-correlation envelope $CC_e$ by taking the absolute value of the cross-correlation analytic signal $CC_{as}$.

$$CC_e=\text{abs}(CC_{as}) \quad \text{Equation 3}$$

In some instances, even when the controller 302 implements a cross-correlation function with a calibrated reference signal, errors in detecting the first and/or second echoes 204, 206 in an ultrasonic signal can occur. For example, the presence of parasitic noise and/or parasitic echoes in an ultrasonic signal near the first echo 204 and/or the second echo 206 can result in the cross-correlation function incorrectly identifying a first echo 204 and/or a second echo 206. Accordingly, in some examples, the controller 302 performs a check on the shape of a determined cross-correlation envelope $CC_e$ to determine whether parasitic noise and/or parasitic echoes that are likely to negatively affect the identification of the first and/or second echoes 204, 206 are present in the cross-correlation envelope $CC_e$. When performing the check, the number and/or relative amplitude of peaks within the cross-correlation envelope $CC_e$ can be a strong indicator for the quality of the ultrasonic signal in which the first and/or second echoes 204, 206 are being identified.

For example, if the cross-correlation envelope $CC_e$ includes relatively few peaks and/or the relative differences between amplitudes of adjacent peaks in the cross-correlation envelope $CC_e$ are quite large, the ultrasonic signal may include relatively few parasitic echoes and/or little parasitic noise that negatively affect the identification of the first echo 204 and/or the second echo 206. In that regard, if the controller 302 determines that the cross-correlation envelope $CC_e$ includes relatively few peaks and/or the relative difference between amplitudes of adjacent peaks in the cross-correlation envelope $CC_e$ is quite large, the controller 302 may determine that the shape of the cross-correlation envelope $CC_e$ satisfies a quality threshold and/or that the first and/or second echoes 204, 206 were correctly identified in the ultrasonic signal.

As another example, if the cross-correlation envelope $CC_e$ includes relatively many peaks and/or the relative differences between amplitudes of adjacent peaks in the cross-correlation envelope $CC_e$ are quite small, the ultrasonic signal may include relatively large parasitic echoes and/or significant amounts parasitic noise. In that regard, if the controller 302 determines that the cross-correlation envelope $CC_e$ includes relatively many peaks and/or the relative differences between amplitudes of adjacent peaks in the cross-correlation envelope $CC_e$ are quite small, the controller 302 may determine that the shape of the cross-correlation envelope $CC_e$ does not satisfy a quality threshold and/or that the first and/or second echoes 204, 206 were incorrectly identified in the ultrasonic signal. In some examples, in response to determining that the shape of the cross-correlation envelope $CC_e$ does not satisfy a quality threshold and/or that the first and/or second echoes 204, 206 were incorrectly identified in the ultrasonic signal, the controller 302 implements a Hilbert envelope method to identify the first echo 204 and/or the second echo 206 in the ultrasonic signal.

Figure 5:
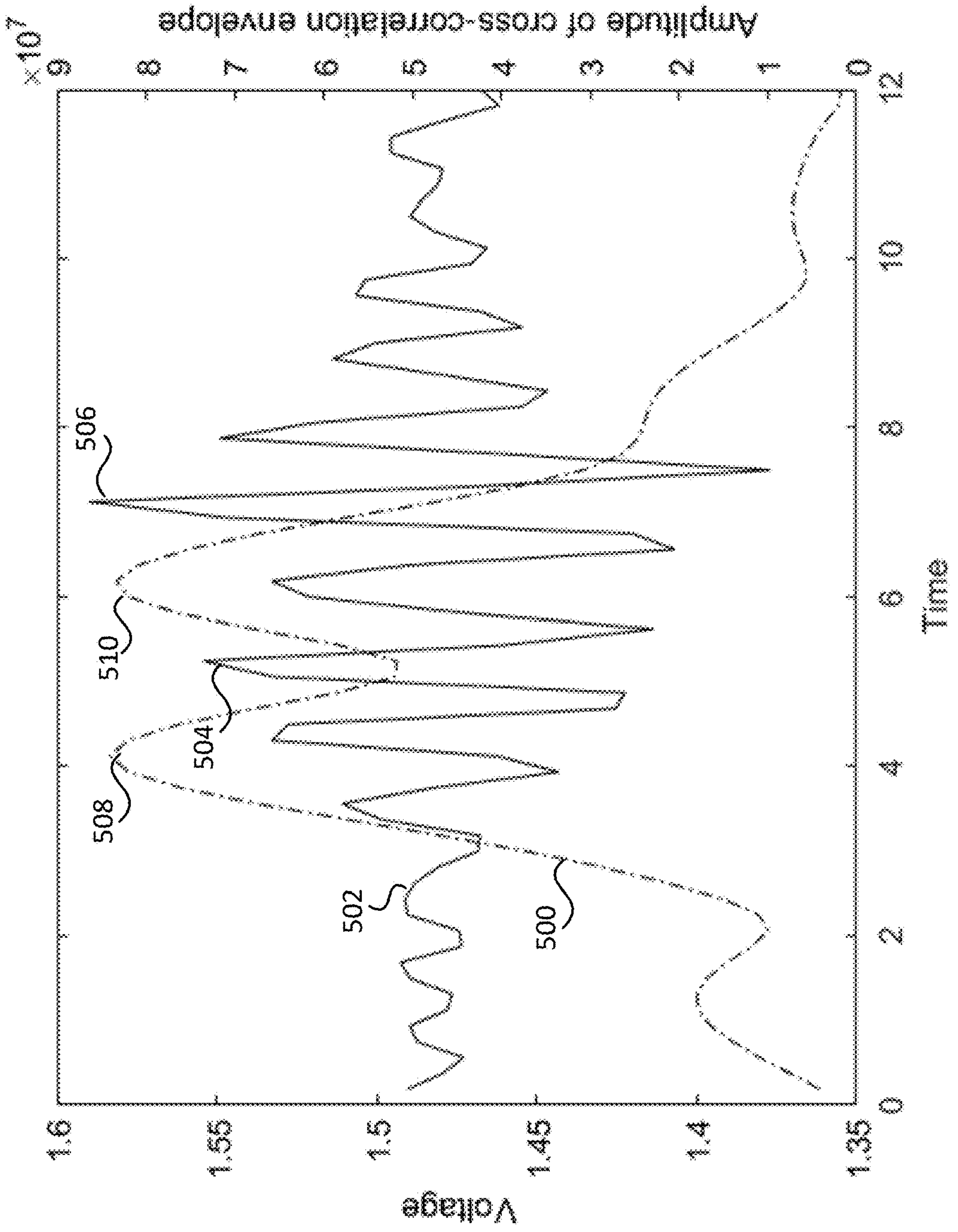
FIG. 5 illustrates an example cross-correlation envelope for an ultrasonic signal in which a parasitic echo is intertwined with a useful echo, according to various embodiments.

FIG. 5 illustrates an example cross-correlation envelope for an ultrasonic signal in which a parasitic echo is intertwined with a useful echo, according to various embodiments. For example, FIG. 5 illustrates a cross-correlation envelope 500 for an ultrasonic signal 502 generated by the ultrasonic transducer 126 in which a parasitic echo 504 in the ultrasonic signal 502 is intertwined with a useful echo 506 in the ultrasonic signal 502. The useful echo 506 can be, for example, the first echo 204 reflected off the piston face 116 or the second echo 206 reflected off the step face 120.

As shown in FIG. 5, the amplitude of the peak of the parasitic echo 504 is only slightly less than the amplitude of the peak of the useful echo 506. Moreover, the distance between the peak of the parasitic echo 504 and the peak of useful echo 506 is relatively small. Thus, as a result, the shape of the cross-correlation envelope 500 includes a first peak 508 and a second peak 510 that are relatively close together and similar in amplitude. As described above, because the cross-correlation envelope 500 includes multiple peaks 508, 510 that are close together and have relatively similar amplitudes, the controller 302 may determine that the shape of the cross-correlation envelope 500 does not satisfy a quality threshold and/or that the useful echo 506 cannot be correctly identified in the ultrasonic signal 502. In response, the controller 302 may use the Hilbert envelope method to process the ultrasonic signal 502 and identify the useful echo 506.

When the controller 302 correctly identifies a first echo 204 in an ultrasonic signal, for example by using a cross-correlation function, the controller 302 can further process the ultrasonic signal to determine the time of flight $TOF_{1st}$ of the first echo 204. The time of flight $TOF_{1st}$ of the first echo 204 corresponds to how long the first echo 204 takes to travel from the piston face 116 to the ultrasonic transducer 126. Similarly, when the controller 302 correctly identifies a second echo 206 within an ultrasonic signal, for example by using a cross-correlation function, the controller 302 can further process the ultrasonic signal to determine the time of flight $TOF_{2nd}$ of the second echo 206. The time of flight $TOF_{2nd}$ of the second echo 206 corresponds to how long the second echo 206 takes to travel from the step face 120 to the ultrasonic transducer 126. Furthermore, the controller 302 can determine a time shift TS between the first and second echoes 204, 206, where the time shift TS between the first and second echoes 204, 206 is equal to the difference between the time of flight $TOF_{1st}$ of the first echo 204 and the time of flight $TOF_{2nd}$ of the second echo 206.

Using Equation 4 below, the controller 302 can then determine the distance $D_{face}$ from the base 112 of the cylinder 102 to the piston face 116 (e.g., the position of the piston 104) based on the time of flight $TOF_{1st}$ of the first echo 204, the known distance $D_{step}$ between the piston face 116 and the step face 120, and the time shift TS between receipt of the first echo 204 by the ultrasonic transducer 126 and receipt of the second echo 206 by the ultrasonic transducer 126. As described herein, the distance $D_{face}$ from the base 112 of the cylinder 102 to the piston face 116 corresponds to the position of the piston 104. Importantly, by using Equation 4 shown below, the position of the piston 104 can be determined independent of the pressure and/or temperature conditions within the first chamber 108. Stated another way, by using the time shift TS between the first echo 204 reflected off the piston face 116 and the second echo 206 reflected off the step face 120, where the piston face 116 is separated from the step face 120 by the known distance $D_{step}$, the controller 302 can determine the position of the piston 104 independent of the pressure and/or temperature within the first chamber 108.

$$D_{face} = \frac{D_{step} * TOF_{1st}}{TS} \qquad \text{Equation 4}$$

As described herein, in some instances, the first echo 204 and/or the second echo 206 can be incorrectly identified within an ultrasonic signal. For example, when parasitic echoes (e.g., parasitic echo 210) and/or parasitic noise are intertwined with the first echo 204 and/or the second echo 206, the controller 302 may incorrectly identify the first echo 204 and/or the second echo 206 within the ultrasonic signal. As further described herein, when the controller 302 determines a position of the piston 104 based on an echo that was incorrectly identified as the first echo 204 and/or the second echo 206, the determined position of the piston 104 will not be accurate. Thus, during an initialization step in which the controller 302 identifies a first echo 204 and a second echo 206 in an ultrasonic signal generated by the ultrasonic transducer 126, the controller 302 can perform one or more physical checks to determine whether the first echo 204 and/or the second echo 206 were correctly identified in the ultrasonic signal.

In that regard, the respective times of flight and/or velocities of the first and second echoes 204, 206 propagating through the hydraulic fluid in the first chamber 108 are governed by principles of ultrasonic physics. For example, the velocity of the first echo 204 propagating through the hydraulic fluid in the first chamber 108 is equal to the velocity of the second echo 206 propagating through the hydraulic fluid in the first chamber 108 because the first and second echoes 204, 206 are subject to the same pressure and temperature conditions within the first chamber 108. Accordingly, using Equation 5 below, the controller 302 can determine the velocity $V_{calculated}$ of the first and second echoes 204, 206 identified in the ultrasonic signal based on (i) the known distance $D_{step}$ by which the piston face 116 is separated from the step face 120 and (ii) the determined time shift TS between the first echo 204 and the second echo 206.

$$V_{calculated} = 2 * \frac{D_{step}}{TS} \qquad \text{Equation 5}$$

The controller 302 can also determine a theoretical value for the sound velocity $V_{theoretical}$ of ultrasonic echoes propagating through the hydraulic fluid in the first chamber 108 based on, for example, known pressure and temperature conditions within the first chamber 108. As described herein, the pressure and temperature conditions within the first chamber 108 can be respectively determined based on measurements generated by the pressure sensor(s) 122 and the temperature sensor(s) 124. Thus, using Equation 6 below, the controller 302 can determine the value of the theoretical sound velocity $V_{theoretical}$ for ultrasonic echoes propagating through the hydraulic fluid in the first chamber 108 based on a pressure P within the first chamber 108 measured by the pressure sensor 122, a temperature T within the first chamber 108 measured by the temperature sensor 124, and a plurality of 2-dimensional polynomial filters c1-c6.

$$V_{theoretical}=c1*P^2+c2*P+c3*T^2+c4*T+c5*P*T+c6 \qquad \text{Equation 6}$$

The controller 302 can then compare the calculated velocity $V_{calculated}$ of the first and second echoes 204, 206 to the theoretical sound velocity $V_{theoretical}$ for ultrasonic echoes propagating through the hydraulic fluid in the first chamber 108 to determine whether the first and second echoes, 204, 206 were correctly identified. In some examples, the controller 302 can determine whether calculated velocity $V_{calculated}$ of the first and second echoes 204, 206 is incorrect and/or whether the first and/or second echoes 204, 206 were incorrectly identified based on a difference between the calculated velocity $V_{calculated}$ of the first and second echoes 204, 206 and the theoretical sound velocity $V_{theoretical}$ for ultrasonic echoes propagating through the hydraulic fluid in the first chamber 108.

For example, if the difference between the calculated velocity $V_{calculated}$ and the theoretical sound velocity $V_{theoretical}$ is less than a threshold (e.g., 10, 20, 40, etc.), the controller 302 determines that the calculated velocity $V_{calculated}$ of the first and second echoes 204, 206 is correct and/or that the first and/or second echoes 204, 206 were correctly identified. Stated another way, the controller 302 determines that the physical check on the calculated velocity $V_{calculated}$ passed when the difference between the calculated velocity $V_{calculated}$ and the theoretical sound velocity $V_{theoretical}$ is less than a threshold. In response to the physical check passing, the controller 302 can proceed with continuous tracking of the position of the piston 104.

However, if the difference between the calculated velocity $V_{calculated}$ and the theoretical sound velocity $V_{theoretical}$ exceeds a threshold (e.g., 10, 20, 40, etc.), the controller 302 determines that the calculated velocity $V_{calculated}$ of the first and second echoes 204, 206 is incorrect and/or that the first and/or second echoes 204, 206 were incorrectly identified. Stated another way, the controller 302 determines that the physical check on the calculated velocity $V_{calculated}$ failed when the difference between the calculated velocity $V_{calculated}$ and the theoretical sound velocity $V_{theoretical}$ exceeds a threshold. In response to the physical check failing, the controller 302 does not proceed with continuous tracking of the position of the piston 104. Rather, the controller 302 proceeds with using an alternative method, such as the Hilbert envelope method, to identify the first and second echoes 204, 206 within the ultrasonic signal and determine, based on the identified first and second echoes 204, 206, an initial position of the piston 104.

In one example, the controller 302 can determine that the calculated velocity V calculated of the first and second echoes 204, 206 is incorrect and/or that the first and/or second echoes 204, 206 were incorrectly identified when either of the following conditions is met:

$$V_{calculated} < V_{theoretical} - 20 \qquad \text{Condition 1}$$

$$V_{calculated} > V_{theoretical} + 20 \qquad \text{Condition 2}$$

If the controller 302 determines that neither Condition 1 nor Condition 2 above are met, the controller 302 determines that the calculated velocity $V_{calculated}$ of the first and second echoes 204, 206 is correct and/or that the first and/or second echoes 204, 206 were correctly identified. Stated another way, the controller 302 determines that the physical check on the calculated velocity $V_{calculated}$ passed when neither Condition 1 nor Condition 2 is met. In response to the physical check passing, the controller 302 can proceed with continuous tracking of the position of the piston 104.

In contrast, if the controller 302 determines that one of Condition 1 or Condition 2 above is met, the controller 302 determines that the calculated velocity $V_{calculated}$ of the first and second echoes 204, 206 is incorrect and/or that the first and/or second echoes 204, 206 were incorrectly identified. Stated another way, the controller 302 determines that the physical check on the calculated velocity $V_{calculated}$ failed when one of Condition 1 or Condition 2 is met. In response to the physical check failing, the controller 302 does not proceed with continuous tracking of the position of the piston 104. Rather, the controller 302 proceeds with using an alternative method, such as the Hilbert envelope method, to identify the first and second echoes 204, 206 within the ultrasonic signal and determine, based on the identified first and second echoes 204, 206, an initial position of the piston 104.

When implementing the Hilbert envelope method to identify a first echo 204 and/or a second echo 206 in an ultrasonic signal generated by the ultrasonic transducer 126, the controller 302 determines the envelope of the ultrasonic signal. The envelope of the of the ultrasonic signal includes a first peak that corresponds to the maximum amplitude of the first echo 204 and a second peak that corresponds to the maximum amplitude of the second echo 206. In that regard, the controller 302 can identify the first echo 204 in the ultrasonic signal based on the first peak in the envelope of the ultrasonic signal and can identify the second echo 206 in the ultrasonic signal based on the second peak in the envelope of the ultrasonic signal. Then, the controller 302 can determine a time shift TS between the first and second echoes 204, 206 based on a time difference between the first and second peaks in the envelope of the ultrasonic signal. After determining the time shift TS between the first and second echoes 204, 206, the controller can use Equation 4 described herein to determine the initial position of the piston 104.

Although the envelope of an ultrasonic signal can include one or more additional peaks that correspond to parasitic noise and/or parasitic echoes in the ultrasonic signal, the controller 302 can distinguish the peaks that correspond to the first and second echoes 204, 206 from the peaks corresponding to parasitic noise and/or parasitic echoes because the respective amplitudes of the peaks that correspond to the first and second echoes 204, 206 are greater than the amplitudes of peaks corresponding to parasitic noise and/or parasitic echoes. In some examples, the controller 302 can reject parasitic noise and/or parasitic echoes having amplitudes less than a particular amplitude threshold from the envelope of an ultrasonic signal. When compared to the cross-correlation functions used to identify first and/or second echoes 204, 206 in an ultrasonic signal described herein, the Hilbert envelope method does not take into account the specific shape of echoes of an ultrasonic pulse emitted by the ultrasonic transducer 126. However, the Hilbert envelope method is still a reliable back-up method for determining the position of the piston 104.

Figure 6:
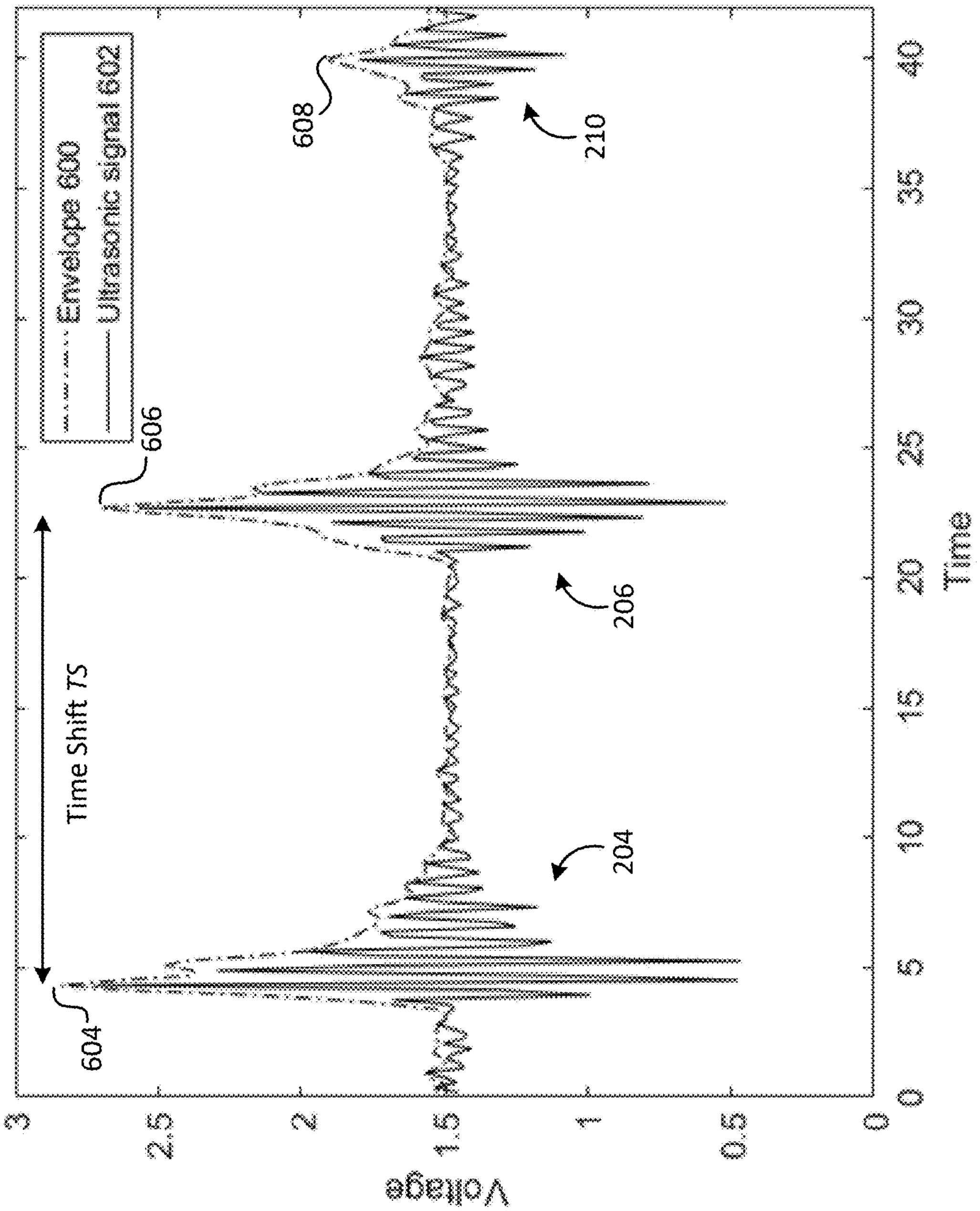
FIG. 6 illustrates an example Hilbert envelope for an ultrasonic signal, according to various embodiments.

FIG. 6 illustrates an example Hilbert envelope for an ultrasonic signal, according to various embodiments. For example, FIG. 6 illustrates a Hilbert envelope 600 for an ultrasonic signal 602 generated by the ultrasonic transducer 126. As shown in FIG. 6, the Hilbert envelope 600 includes a first peak 604 that corresponds to the occurrence of the first echo 204 in the ultrasonic signal 602 and a second peak 606 that corresponds to the occurrence of the second echo 206 in the ultrasonic signal 602. As described herein, the controller 302 can determine a time shift TS between the first and second echoes 204, 206 in the ultrasonic signal 602 based on a time difference between the first and second peaks 604, 606 in the Hilbert envelope 600. As further shown in FIG. 6, the Hilbert envelope 600 includes a third peak 608 that corresponds to a parasitic echo (e.g., parasitic echo 210) in the ultrasonic signal 602. However, when identifying the first and second echoes 204, 206 in the ultrasonic signal 602 using the Hilbert envelope method, the controller 302 can ignore the third peak 608 because the amplitude of the third peak 608 is significantly less than the respective amplitudes of the first peak 604 and the second peak 606.

Figure 7:
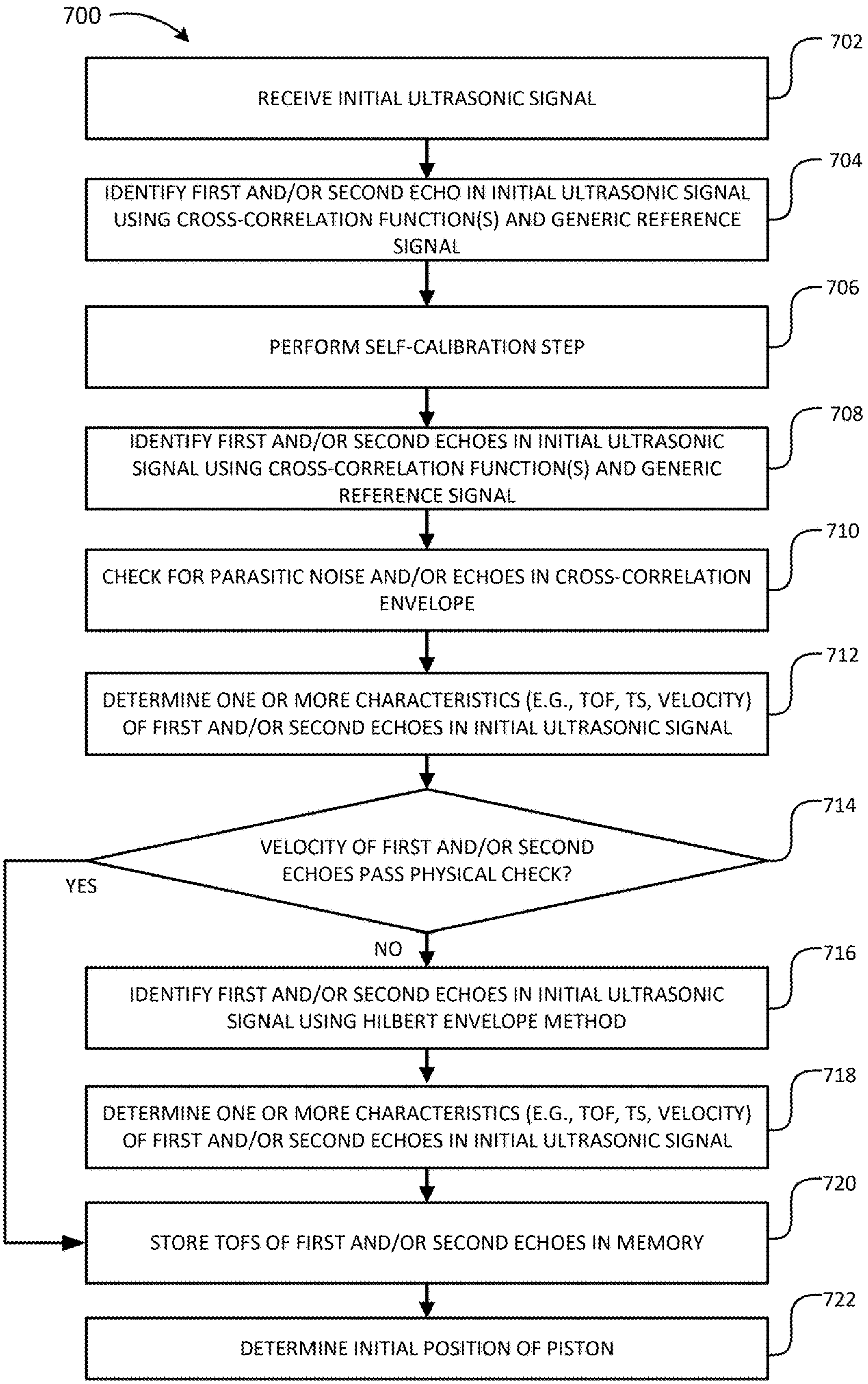
FIG. 7 is a flow diagram of method steps for initializing a process for detecting the position of a piston included in a hydraulic actuator, according to various embodiments.

FIG. 7 is a flow diagram of method steps for initializing a process for detecting the position of a piston, such as the piston 104, included in a hydraulic actuator, according to various embodiments. Although the method steps are described in conjunction with the systems of FIGS. 1-6, persons skilled in the art will understand that any system configured to perform the method steps, in any order, is within the scope of the present disclosure.

As shown, a method 700 begins at step 702, at which a controller receives an initial ultrasonic signal from an ultrasonic transducer. For example, the controller 302 receives an initial ultrasonic signal from the ultrasonic transducer 126 disposed on the base 112 of the cylinder 102 included in hydraulic actuator 100. As described herein, the ultrasonic transducer 126 can generate an ultrasonic signal by emitting an ultrasonic pulse 200 in the first direction 202 towards the piston 104 in cylinder 102 and receiving, or detecting, a first echo 204 of the ultrasonic pulse 200 reflected off the piston face 116 and a second echo 206 of the ultrasonic pulse 200 reflected off the step face 120. In some examples, the initial ultrasonic signal further includes parasitic noise and/or one or more parasitic echoes 210 of the ultrasonic pulse 200. In some examples, the initial ultrasonic signal generated by the ultrasonic transducer 126 is a waveform that includes a first pulse that corresponds to the first echo 204, a second pulse that corresponds to the second echo 206, and one or more other pulses that correspond to parasitic noise and/or parasitic echoes 210.

At step 704, a controller scans, or processes, the initial ultrasonic signal to identify a first echo in the ultrasonic signal and a second echo in the initial ultrasonic signal. For example, the controller 302 scans the initial ultrasonic signal to identify the first echo 204 reflected off the piston face 116 and the second echo 206 reflected off the step face 120. In some examples, at step 704, the controller 302 implements a cross-correlation function, for example using one or more of Equations 1-3 described herein, to identify the first and second echoes 204, 206 in the initial ultrasonic signal. In some examples, at step 704, the controller 302 uses a generic reference signal to implement the cross-correlation function.

At step 706, a controller performs a self-calibration step. During the self-calibration step, for example, the controller 302 can generate a calibrated reference signal that is specific to the type of ultrasonic transducer 126 being used and/or the type of hydraulic actuator 100 for which the ultrasonic transducer 126 is used to detect the position of the piston 104. For example, the calibrated reference signal can be generated using an algorithm based on manufacturing parameters Q of the cylinder 102 and/or the piston 104, a resonance frequency $f_{res}$ of the ultrasonic transducer 126, and a known function that describes an ultrasonic echo.

At step 708, a controller re-scans, or re-processes, the initial ultrasonic signal using calibrated parameters to identify the first echo in the initial ultrasonic signal and the second echo ultrasonic signal. For example, the controller 302 can re-scan, or re-process, the initial ultrasonic signal by implementing a cross-correlation function in combination with the calibrated reference signal generated at step 706. In that regard, the controller 302 identifies the first echo 204 and/or the second echo 206 in the initial ultrasonic signal by using the cross-correlation function in combination with the calibrated reference signal generated at step 706.

At step 710, a controller checks for parasitic signals, such as parasitic noise and/or parasitic echoes, in the cross-correlation envelope for the cross-correlation between the initial ultrasonic signal and the reference signal. For example, the controller 302 analyzes the shape of the cross-correlation envelope to determine whether any parasitic noise and/or parasitic echoes are present in the cross-correlation envelope for the cross-correlation between the initial ultrasonic signal and the reference signal. As described herein, if the cross-correlation envelope includes relatively few peaks and/or the relative differences between amplitudes of adjacent peaks in the cross-correlation envelope is quite large, the initial ultrasonic signal may include relatively few parasitic echoes and/or little parasitic noise. Moreover, as described herein, if the cross-correlation envelope includes relatively many peaks and/or the relative differences between amplitudes of adjacent peaks in the cross-correlation envelope are quite small, the initial ultrasonic signal may include relatively large parasitic echoes and/or significant amounts parasitic noise.

In some examples, if the controller 302 determines that the initial ultrasonic signal includes relatively large parasitic echoes and/or significant amounts parasitic noise at step 710, the controller 302 can proceed with using the Hilbert envelope method to calculate, or determine, one or more characteristics of the first and second echoes identified in the initial ultrasonic signal at step 708. In such examples, the controller 302 can use initial manufacturing parameters of the ultrasonic transducer 126 to determine the one or more characteristics of the first and second echoes identified at step 708. The controller 302 may continue to use the Hilbert Envelope method until piston 104 stops moving, where at this time the controller 302 attempt to re-initialize the ultrasonic transducer 126 and use the cross-correlation methods described herein.

If the controller 302 determines that the initial ultrasonic signal includes relatively few parasitic echoes and/or insignificant amounts parasitic noise at step 710, the method 700 proceeds to step 712.

At step 712, a controller calculates, or determines, one or more characteristics of the first and second echoes identified in the initial ultrasonic signal at step 708. For example, at step 712, the controller 302 can determine, based on the initial ultrasonic signal and/or the cross-correlation envelope for the cross-correlation between the initial ultrasonic signal and the reference signal, one or more of the time of flight $TOF_{1st}$ of the first echo 204 identified in the initial ultrasonic signal at step 708, the time of flight $TOF_{2nd}$ of the second echo 206 identified in the initial ultrasonic signal at step 708, and/or a time shift TS between the first and second echoes 204, 206 identified in the initial ultrasonic signal at step 708. In some examples, at step 712, the controller 302 can further calculate, or determine, the velocity at which the first echo 204 and/or the second echo 206 propagates through the hydraulic fluid in first chamber 108 based on (i) the known distance $D_{step}$ between the piston face 116 and (ii) the step face 120 and the time shift TS between the first and second echoes 204, 206 identified in the initial ultrasonic signal at step 708. For example, the controller 302 can use Equation 5 described herein to calculate the velocity of the first and second echoes 204, 206 identified in the initial ultrasonic signal at step 708.

At step 714, a controller performs one or more physical checks based on principles of ultrasonic physics to determine whether the first and/or second echoes were correctly identified in the initial ultrasonic signal at step 708. In one example of a physical check, the controller 302 determines whether the velocity of the first and second echoes 204, 206 calculated at step 712 differs from a theoretical sound velocity for ultrasonic echoes propagating through the hydraulic fluid in the first chamber 108 by less than a threshold amount (e.g., 20, 40, or some other threshold amount). As described herein, the controller 302 can use Equation 6 to calculate the theoretical sound velocity for ultrasonic echoes propagating through the hydraulic fluid in the first chamber 108.

If, at step 714, the controller 302 determines that the difference between the velocity of the first and second echoes 204, 206 calculated at step 712 and the theoretical sound velocity for ultrasonic echoes propagating through the hydraulic fluid in the first chamber 108 is less than a threshold, the controller 302 determines that the velocity of the first and second echoes 204, 206 was correctly calculated at step 712 and/or that the first and second echoes 204, 206 were correctly identified in the initial ultrasonic signal at step 708. In response to the controller 302 determining that the velocity of the first and second echoes 204, 206 was correctly calculated at step 712 and/or that the first and second echoes 204, 206 were correctly identified in the initial ultrasonic signal at step 708, the method 700 proceeds to step 720.

However, if at step 714, the controller 302 determines that the difference between the velocity of the first and second echoes 204, 206 calculated at step 712 and the theoretical sound velocity for ultrasonic echoes propagating through the hydraulic fluid in the first chamber 108 exceeds a threshold, the controller 302 determines that the velocity of the first and second echoes 204, 206 was incorrectly calculated at step 712 and/or that the first and second echoes 204, 206 were incorrectly identified in the initial ultrasonic signal at step 708. In response to the controller 302 determining that the velocity of the first and second echoes 204, 206 was incorrectly calculated at step 712 and/or that the first and second echoes 204, 206 were incorrectly identified in the initial ultrasonic signal at step 708, the method 700 proceeds to step 716.

In some examples, at step 714, the controller 302 can further perform a physical check on the signal-to-noise ratio (SNR) of the initial ultrasonic signal. In such examples, the controller 302 determines whether the SNR of the initial ultrasonic signal satisfies a threshold condition. For example, the controller 302 can determine whether the SNR of the initial ultrasonic signal is greater than 6 dB, greater than 20 dB, or greater than some other threshold amount. If the SNR of the initial ultrasonic signal does not satisfy a threshold condition, the method 700 proceeds to step 716. However, if the SNR of the initial ultrasonic signal does satisfy a threshold condition, the method 700 proceeds to step 720.

At step 716, a controller implements a Hilbert envelope method to identify a first echo in the initial ultrasonic signal and/or a second echo in the ultrasonic signal. For example, the controller 302 uses the Hilbert envelope to identify, in the initial ultrasonic signal, the first echo 204 reflected off the piston face 116 and the second echo 206 reflected off the step face 120.

At step 718, a controller calculates, or determines, one or more characteristics of the first and second echoes identified in the initial ultrasonic signal at step 716. For example, at step 718, the controller 302 can determine, based on the Hilbert envelope of initial ultrasonic signal determined at step 716, one or more of the time of flight $TOF_{1st}$ of the first echo 204 identified in the initial ultrasonic signal at step 716, the time of flight $TOF_{2nd}$ of the second echo 206 identified in the initial ultrasonic signal at step 716, and/or a time shift TS between the first and second echoes 204, 206 identified in the initial ultrasonic signal at step 716. In some examples, at step 718, the controller 302 can further calculate, or determine, the velocity at which the first echo 204 and/or the second echo 206 propagates through hydraulic fluid in the first chamber 108 based on (i) the known distance $D_{step}$ between the piston face 116 and the step face 120 and (ii) the time shift TS between the first and second echoes 204, 206 identified in the initial ultrasonic signal at step 716. For example, the controller 302 can use Equation 5 described herein to calculate the velocity of the first and second echoes 204, 206 identified in the initial ultrasonic signal at step 716.

At step 720, a controller stores the respective times of flights of the first and second echoes that were determined at step 712 or step 718. For example, the controller 302 stores the time of flight $TOF_{1st}$ of the first echo 204 that was determined at step 712 or step 718 in the memory 306 and/or stores the time of flight $TOF_{2nd}$ of the second echo 206 that was determined at step 712 or step 718. As will be described in more detail herein, the time of flight $TOF_{1st}$ of the first echo 204 and/or the time of flight $TOF_{2nd}$ of the second echo 206 can be used in a position tracking loop for tracking the position of the piston 104.

In some examples, the method 700 further includes a step 722 at which a controller calculates, or determines, an initial position of the piston 104. For example, at step 722, the controller 302 can use Equation 4 described herein to determine the initial position of the piston 104 based on the time of flight $TOF_{1st}$ of the first echo 204, the known distance $D_{step}$ between the piston face 116 and the step face 120, and the time shift TS between the first echo 204 and the second echo 206. As described herein, the controller 302 can determine the initial position of the piston 104 independent of the pressure and/or temperature conditions of the first chamber 108 in the cylinder 102 of hydraulic actuator 100.

After an initialization step in which the controller 302 correctly identifies the first and second echoes 204, 206 within an initial ultrasonic signal generated by the ultrasonic transducer 126 and/or determines an initial position of the piston 104 (e.g., using the cross-correlation function or the Hilbert envelope method), the controller 302 can proceed with continuous tracking of the piston position as the piston 104 extends and retracts within the cylinder 102 during operation of the hydraulic actuator 100. Continuous tracking of the piston position can hereinafter be referred to as a position tracking loop.

During each iteration of the position tracking loop, the controller 302 can receive a new, or updated, ultrasonic signal generated by the ultrasonic transducer 126. Then, using one or more of the cross-correlation functions described herein, the controller 302 can identify the first and second echoes 204, 206 within the updated ultrasonic signal. Furthermore, using one or more of the techniques described herein and based on the first and second echoes 204, 206 identified within the updated ultrasonic signal, the controller 302 can determine one or more of an updated time shift TS between the first and second echoes 204, 206, an updated time of flight $TOF_{1st}$ of the first echo 204, an updated time of flight $TOF_{2nd}$ of the second echo 206, an updated position of the piston 104 (e.g., for example using Equation 4), and/or an updated velocity of the first and second echoes 204, 206 (e.g., for example using Equation 5). Notably, with the techniques described herein, the controller 302 can determine each of these updated values independent of the pressure and/or temperature conditions within the first chamber 108.

As described herein with respect to the initializations step, in some instances, the first echo 204 and/or the second echo 206 can be incorrectly identified within an ultrasonic signal generated by the ultrasonic transducer 126. Thus, as the controller 302 continuously determines updated positions of the piston 104 during a position tracking loop, the controller 302 can perform one or more physical checks to determine whether the first echo 204 and/or the second echo 206 were correctly identified in the updated ultrasonic signal.

In a first physical check performed by the controller 302 during implementation of the position tracking loop, the controller 302 determines whether an updated time of flight of the first echo 204 calculated during a current iteration of the position tracking loop differs from a time of flight of the first echo 204 calculated in the previous iteration of the position tracking loop by an amount that exceeds the maximum time of flight change from one iteration of the tracking loop to another. For example, the controller 302 can determine, based on a known maximum velocity of the piston 104, a maximum amount $TOF_{max}$ by which the time of flight of the first echo 204 can change between concurrent iterations of the position tracking loop.

Using Equation 7 below, the controller 302 can determine the amount $TOF_{change}$ by which the time of flight of the first echo 204 changes between iteration i−1 of the position tracking loop and iteration i of the position tracking loop. In Equation 7, $TOF_{1st(i-1)}$ is the time of flight of the first echo 204 during iteration i−1 of the position tracking loop and $TOF_{1st(i)}$ is the time of flight of the first echo 204 during iteration i of the position tracking loop.

$$TOF_{change}=|TOF_{1st(i-1)}-TOF_{1st(i)}| \quad \text{Equation 7}$$

If the amount $TOF_{change}$ exceeds the maximum amount $TOF_{max}$, the controller 302 determines that the first physical check has failed. When the first physical check fails, the controller 302 determines that the first and/or second echoes 204, 206 were incorrectly identified in the updated ultrasonic signal during iteration i of the position tracking loop and/or that the time of flight $TOF_{1st(i)}$ of the first echo 204 was incorrectly determined during iteration i of the position tracking loop.

In some examples, in response to the first physical check failing during an iteration i of the position tracking loop, the controller 302 uses the Hilbert envelope method to identify the first and/or second echoes 204, 206 in the updated ultrasonic signal. Then, using one or more of the techniques described herein and based on the first and second echoes 204, 206 identified within the update ultrasonic signal using the Hilbert envelope method, the controller 302 can determine one or more of an updated time shift TS between the first and second echoes 204, 206, an updated time of flight $TOF_{1st}$ of the first echo 204, an updated time of flight $TOF_{2nd}$ of the second echo 206, an updated position of the piston 104 (e.g., for example using Equation 4), and/or an updated velocity of the first and second echoes 204, 206 (e.g., for example using Equation 5).

In a second physical check performed by the controller 302 during implementation of the position tracking loop, the controller 302 determines whether an updated time shift between the first and second echoes 204, 206 calculated during a current iteration of the position tracking loop differs from a time shift between the first and second echoes 204, 206 that was calculated in the previous iteration of the position tracking loop by an amount that exceeds the maximum time shift change from one iteration of the tracking loop to another. For example, the controller 302 can determine, based on measured pressure and/or temperature conditions within the first chamber 108 of the cylinder 102, a maximum amount $TS_{max}$ by which the time shift between the first and second echoes 204, 206 can change between concurrent iterations of the position tracking loop.

Using Equation 8 below, the controller 302 can determine the amount $TS_{change}$ by which the time shift between the first and second echoes 204, 206 changes between iteration i−1 of the position tracking loop and iteration i of the position tracking loop. In Equation 8, $TS_{(i-1)}$ is the time shift between the first and second echoes 204, 206 during iteration i−1 of the position tracking loop and $TS_{(i)}$ is the time shift between the first and second echoes 204, 206 during iteration i of the position tracking loop.

$$TS_{change}=|TS_{(i-1)}-TS_{(i)}| \quad \text{Equation 8}$$

If the amount $TS_{change}$ exceeds the maximum amount $TS_{max}$, the controller 302 determines that the second physical check has failed. When the second physical check fails, the controller 302 determines that the first and/or second echoes 204, 206 were incorrectly identified in the updated ultrasonic signal during iteration i of the position tracking loop and/or that the time shift $TS_{(i)}$ between the first and second echoes 204, 206 was incorrectly determined during iteration i of the position tracking loop.

In some examples, in response to the second physical check failing during an iteration i of the position tracking loop, the controller 302 uses the Hilbert envelope method to identify the first and/or second echoes 204, 206 in the updated ultrasonic signal. Then, using one or more of the techniques described herein and based on the first and second echoes 204, 206 identified within the updated ultrasonic signal using the Hilbert envelope method, the controller 302 can determine one or more of an updated time shift TS between the first and second echoes 204, 206, an updated time of flight $TOF_{1st}$ of the first echo 204, an updated time of flight $TOF_{2nd}$ of the second echo 206, an updated position of the piston 104 (e.g., for example using Equation 4), and/or an updated velocity of the first and second echoes 204, 206 (e.g., for example using Equation 5).

In a third physical check performed by the controller 302 during implementation of the position tracking loop, the controller 302 determines whether a calculated velocity $V_i$ of the first and second echoes 204, 206 during a current iteration of the position tracking loop differs from a reference velocity, such as the theoretical sound velocity $V_{theoretical}$ or the velocity $V_{calculated}$ of the first and second echoes 204, 206 that was calculated during the initialization step, by more than a threshold amount.

For example, using Equation 5 described herein, the controller 302 can calculate the velocity $V_i$ of the first and second echoes 204, 206 during a current iteration i of the position tracking loop. For examples in which the pressure and temperature conditions within the first chamber 108 can be determined (e.g., via pressure sensor(s) 122 and temperature sensor(s) 124), the controller 302 can use Equation 6 to determine the theoretical sound velocity $V_{theoretical}$ based on measurements of the pressure and/or temperature conditions in the first chamber 108 that were taken during the current iteration i of the position tracking loop. In such examples, if the difference between the calculated velocity $V_i$ and the theoretical sound velocity $V_{theoretical}$ exceeds a threshold (e.g., 10, 20, 40, etc.), the controller 302 determines that the third physical check failed.

For examples, in which the pressure and temperature conditions within the first chamber 108 cannot be determined (e.g., there are no pressure sensor(s) 122 and temperature sensor(s) 124), the controller 302 can use the velocity $V_{calculated}$ of the first and second echoes 204, 206 that was calculated during the initialization step as a reference velocity. In such examples, if the difference between the calculated velocity $V_i$ and the velocity $V_{calculated}$ of the first and second echoes 204, 206 that was calculated during the initialization step exceeds a threshold (e.g., 10, 20, 40, etc.), the controller 302 determines that the third physical check failed.

In some examples, in response to the third physical check failing during an iteration i of the position tracking loop, the controller 302 uses the Hilbert envelope method to identify the first and/or second echoes 204, 206 in the updated ultrasonic signal. Then, using one or more of the techniques described herein and based on the first and second echoes 204, 206 identified within the updated ultrasonic signal using the Hilbert envelope method, the controller 302 can determine one or more of an updated time shift TS between the first and second echoes 204, 206, an updated time of flight $TOF_{1st}$ of the first echo 204, an updated time of flight $TOF_{2nd}$ of the second echo 206, an updated position of the piston 104 (e.g., for example using Equation 4), and/or an updated velocity of the first and second echoes 204, 206 (e.g., for example using Equation 5).

After the controller 302 performs one or more of the physical checks during an iteration i of the position tracking loop, the controller 302 stores the time of flight $TOF_{1st(i)}$ of the first echo 204 and/or the time of flight $TOF_{2nd(i)}$ of the second echo 206 that were determined during the current iteration i of the position tracking loop in the memory 306. Then, during the next iteration i+1 of the position tracking loop, the controller 302 can use the time of flight $TOF_{1st(i)}$ of the first echo 204 and/or the time of flight $TOF_{2nd(i)}$ of the second echo 206 stored in memory 306 to perform one or more physical checks.

Furthermore, after the controller 302 performs one or more of the physical checks during an iteration i of the position tracking loop, the controller 302 determines the current position of the piston 104 during the iteration i of the position tracking loop. For example, using Equation 4 described herein, the controller 302 can determine the current position $D_{face(i)}$ of the piston 104 (e.g., the distance $D_{face}$ from the base 112 of the cylinder 102 to the piston face 116) based on the time of flight $TOF_{1st(i)}$ of the first echo 204, the known distance $D_{step}$ between the piston face 116 and the step face 120, and the time shift $TS_{(i)}$ between the first and second echoes 204, 206. In some examples, the controller 302 stores the current position $D_{face(i)}$ of the piston 104 in the memory 306. In some examples, the controller 302 outputs the current position $D_{face(i)}$ of the piston 104 via the I/O system 308 and/or the user-interface 312. In some examples, the controller 302 transmits the current position $D_{face(i)}$ of the piston 104 to one or more external computing devices 310.

In some examples, after the controller 302 performs one or more of the physical checks during an iteration i of the position tracking loop, the controller 302 determines a variation in volume, or the volume drawdown, $Vol_i$ in the first chamber 108 between concurrent iterations in the position tracking loop. Using Equation 9 below, the controller 302 can determine the variation in volume $Vol_i$ in the first chamber 108 that occurs between iteration i−1 of the position tracking loop and iteration i of the position tracking loop. In Equation 9, r is the radius of the first chamber 108, $D_{face(i-1)}$ is the position of the piston 104 that was calculated during the previous iteration i−1 of the position tracking loop, and $D_{face(i)}$ is the position of the piston 104 that was calculated during the current iteration I of the position tracking loop.

$$Vol_i=\pi*r^2*(D_{face(i-1)}-D_{face(i)}) \quad \text{Equation 9}$$

In some examples, the controller 302 stores the variation in volume $Vol_i$ in the first chamber 108 in the memory 306. In some examples, the controller 302 outputs the variation in volume $Vol_i$ in the first chamber 108 via the I/O system 308 and/or the user-interface 312. In some examples, the controller 302 transmits the variation in volume $Vol_i$ in the first chamber 108 to one or more external computing devices 310.

Figure 8:
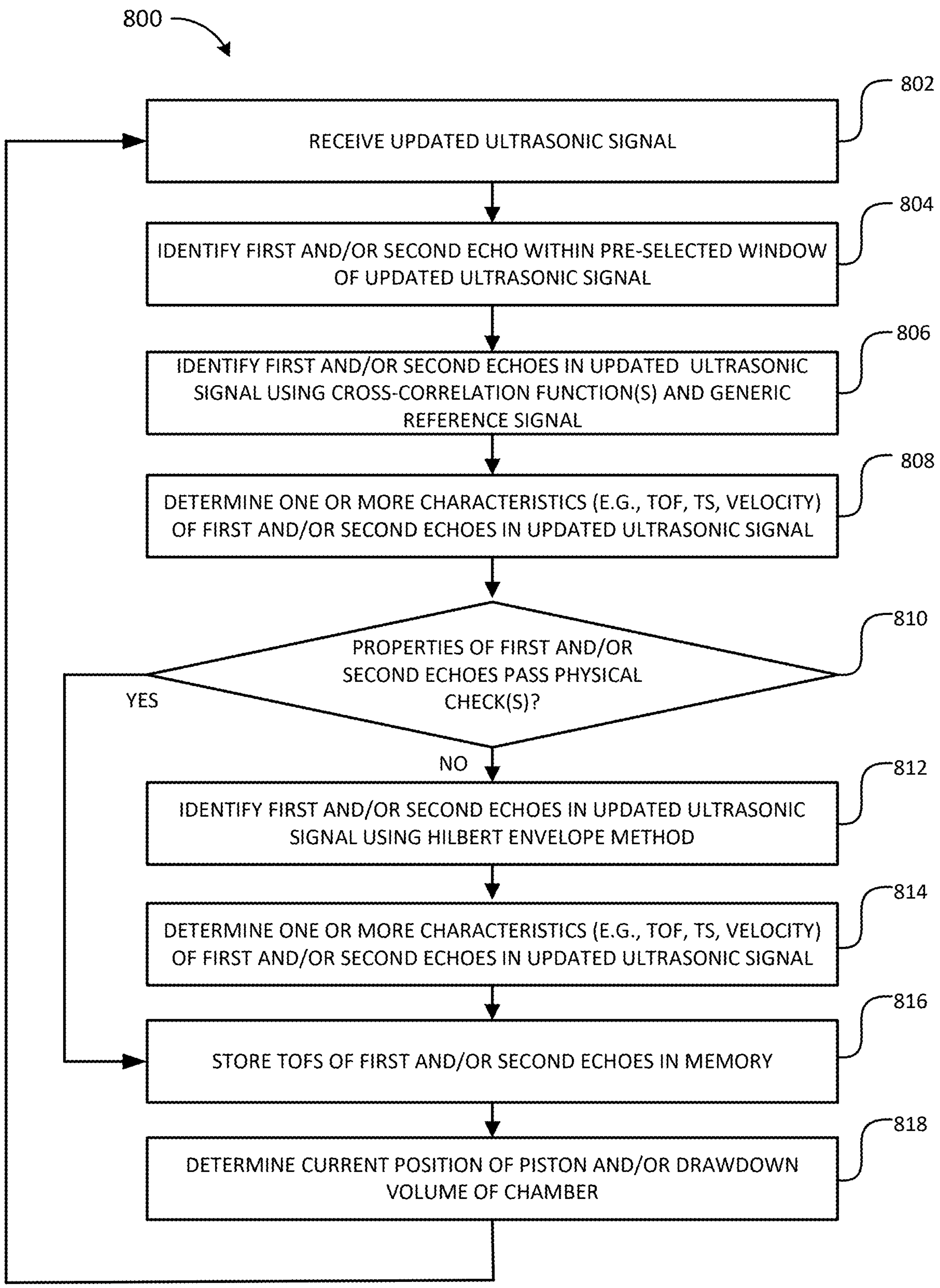
FIG. 8 is a flow diagram of method steps for tracking a position of a piston included in a hydraulic actuator, according to various embodiments.

FIG. 8 is a flow diagram of method steps for tracking the position of a piston, such as the piston 104, included in a hydraulic actuator, according to various embodiments. Although the method steps are described in conjunction with the systems of FIGS. 1-7, persons skilled in the art will understand that any system configured to perform the method steps, in any order, is within the scope of the present disclosure.

As shown, a method 800 begins at step 802, at which a controller receives an updated ultrasonic signal from an ultrasonic transducer. For example, the controller 302 receives an updated ultrasonic signal from the ultrasonic transducer 126 disposed on the base 112 of the cylinder 102 included in hydraulic actuator 100. As described herein, the ultrasonic transducer 126 can generate an ultrasonic signal by emitting an ultrasonic pulse 200 in the first direction 202 towards the piston 104 in cylinder 102 and receives, or detects, a first echo 204 of the ultrasonic pulse 200 reflected off the piston face 116 and a second echo 206 of the ultrasonic pulse 200 reflected off the step face 120. In some examples, the updated ultrasonic signal further includes parasitic noise and/or one or more parasitic echoes 210 of the ultrasonic pulse 200. In some examples, the updated ultrasonic signal generated by the ultrasonic transducer 126 is a waveform that includes a first pulse that corresponds to the first echo 204, a second pulse that corresponds to the second echo 206, and one or more other pulses that correspond to parasitic noise and/or parasitic echoes 210.

At step 804, a controller scans, or processes, the updated ultrasonic signal to identify a first echo and/or a second echo within a pre-selected window of the updated ultrasonic signal. For example, the controller 302 scans the updated ultrasonic signal within the pre-selected window to identify the first echo 204 reflected off the piston face 116 and/or the second echo 206 reflected off the step face 120. The pre-selected window of the updated ultrasonic signal is a time window that was selected, or determined, during a previous iteration of the method 800. For example, at iteration i−1, the first echo is correctly detected in a 64-point window centered around the beginning of the first echo. The index of the waveform corresponding to the center of this window is then stored, for example, by the controller 302. Then, at iteration i, the previously stored index is used as the center a 64-point window that constitutes the pre-selection window.

At step 806, a controller implements one or more cross-correlation functions to refine the identification of the first and/or second echoes in the updated ultrasonic signal. For example, the controller 302 can re-scan, or re-process, the updated ultrasonic signal by using the cross-correlation function in combination with a calibrated reference signal. In that regard, the controller 302 identifies the first echo 204 and/or the second echo 206 in the updated ultrasonic signal by using one or more cross-correlation functions and a calibrated reference signal described herein.

At step 808, a controller calculates, or determines, one or more characteristics of the first and second echoes identified in the updated ultrasonic signal at step 806. For example, at step 808, the controller 302 can determine, based on the updated ultrasonic signal and/or the cross-correlation envelope for the cross-correlation between the updated ultrasonic signal and the calibrated reference signal, one or more of the time of flight $TOF_{1st(i)}$ of the first echo 204 identified in the updated ultrasonic signal at step 806, the time of flight $TOF_{2nd(i)}$ of the second echo 206 identified in the updated ultrasonic signal at step 806, and/or a time shift $TS_{(i)}$ between the first and second echoes 204, 206 identified in the updated ultrasonic signal at step 806. In some examples, at step 808, the controller 302 can further calculate, or determine, the velocity $V_i$ at which the first echo 204 and/or the second echo 206 propagate through hydraulic fluid in the first chamber 108 based on (i) the known distance $D_{step}$ between the piston face 116 and the step face 120 and (ii) the time shift $TS_{(i)}$ between the first and second echoes 204, 206 identified in the updated ultrasonic signal at step 806. For example, the controller 302 can use Equation 5 described herein to calculate the velocity $V_i$ of the first and second echoes 204, 206 identified in the updated ultrasonic signal at step 806.

At step 810, a controller determines whether one or more characteristics of the first and second echoes determined at step 808 pass one or more physical checks. For example, the controller 302 can determine whether the time of flight $TOF_{1st(i)}$ of the first echo 204 determined at step 808 passes the first physical check described herein, can determine whether the time shift $TS_{(i)}$ between the first and second echoes 204, 206 determined at step 808 passes the second physical check described herein, and/or can determine whether the velocity $V_i$ of the first and second echoes 204, 206 determined at step 808 passes the third physical check described herein.

If each of the one or more physical checks performed at step 810 are passed, the method 800 proceeds to step 816. If, however, at least one of the one or more physical checks performed at step 810 are failed, the method proceeds to step 812. In some examples, depending on the refresh rate of the tracking loop (e.g., how quickly the method 800 is repeated), it may be acceptable for the controller 302 to replicate the outputs from iteration i−1 when one or more physical checks are failed at step 810. In such examples, in iteration(s) i+1 and/or i+n, the controller 302 verifies whether the failed physical check in iteration i was a single event or a repeated failed check.

At step 812, a controller implements a Hilbert envelope method to identify a first echo in the updated ultrasonic signal and/or a second echo in the updated ultrasonic signal. For example, the controller 302 uses the Hilbert envelope to identify, in the updated ultrasonic signal, the first echo 204 reflected off the piston face 116 and/or the second echo 206 reflected off the step face 120.

At step 814, a controller calculates, or determines, one or more characteristics of the first and second echoes identified in the updated ultrasonic signal at step 812. For example, at step 814, the controller 302 can determine, based on the Hilbert envelope of updated ultrasonic signal, one or more of the time of flight $TOF_{1st(i)}$ of the first echo 204 identified in the updated ultrasonic signal at step 812, the time of flight $TOF_{2nd(i)}$ of the second echo 206 identified in the updated ultrasonic signal at step 812, and/or a time shift $TS_{(i)}$ between the first and second echoes 204, 206 identified in the updated ultrasonic signal at step 812. In some examples, at step 814, the controller 302 can further calculate, or determine, the velocity $V_i$ at which the first echo 204 and/or the second echo 206 propagate based on (i) the known distance $D_{step}$ between the piston face 116 and the step face 120 and (ii) the time shift $TS_{(i)}$ between the first and second echoes 204, 206 identified at step 812. For example, the controller 302 can use Equation 5 described herein to calculate the velocity $V_i$ of the first and second echoes 204, 206 identified in the updated ultrasonic signal at step 812.

At step 816, a controller stores the respective times of flights of the first and second echoes that were determined at step 808 or step 814. For example, the controller 302 stores the time of flight $TOF_{1st(i)}$ of the first echo 204 that was determined at step 808 or step 814 in the memory 306 and/or stores the time of flight $TOF_{2nd(i)}$ of the second echo 206 that was determined at step 808 or step 814. The time of flight $TOF_{1st(i)}$ of the first echo 204 and/or the time of flight $TOF_{2nd(i)}$ of the second echo 206 stored in memory 306 can be used to perform one or more physical checks at step 810 during the next iteration of method 800.

At step 818, a controller determines a current position of the piston and/or a volume drawdown of a chamber in the cylinder through which the piston moves. For example, the controller 302 can calculate, using Equation 4 described herein, the current position $D_{face(i)}$ of the piston 104 based on the time of flight $TOF_{1st(i)}$ of the first echo 204, the known distance $D_{step}$ between the piston face 116 and the step face 120, and the time shift $TS_{(i)}$ between the first echo 204 and the second echo 206. In that regard, as described herein, the controller 302 can determine the current position $D_{face(i)}$ of the piston 104 independent of the pressure and/or temperature conditions of the first chamber 108 in the cylinder 102 of hydraulic actuator 100. As another example, the controller 302 can use Equation 9 described herein to calculate a variation in volume, or volume drawdown, $Vol_i$ in the first chamber 108 based on the radius r of the first chamber 108, a position $D_{face(i-1)}$ of the piston 104 that was calculated during the previous iteration of the method 800, and the position $D_{face(i)}$ of the piston 104 that was calculated during the current iteration of the method 800.

After step 818, the method 800 returns to step 802 at which method 800 is repeated.

As described above with respect to FIG. 1, in some examples, the piston face 116 can be implemented as a curved surface and/or the step face 120 can be implemented as a curved surface. When compared to flat surfaces, a piston face 116 that is curved and/or a step face 120 that is curved can increase the reflective energy of signals reflected off the curved piston face 116 and/or the curved step face 120.

Figure 9A:
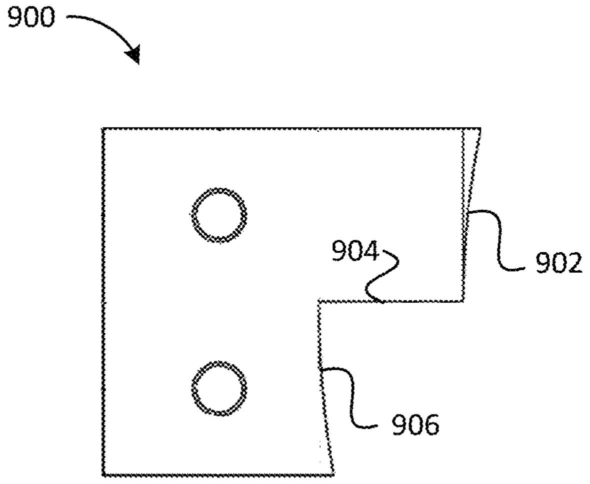
FIG. 9A illustrates a side view of an example piston that includes a two-dimensional curved surface.
Figure 9B:
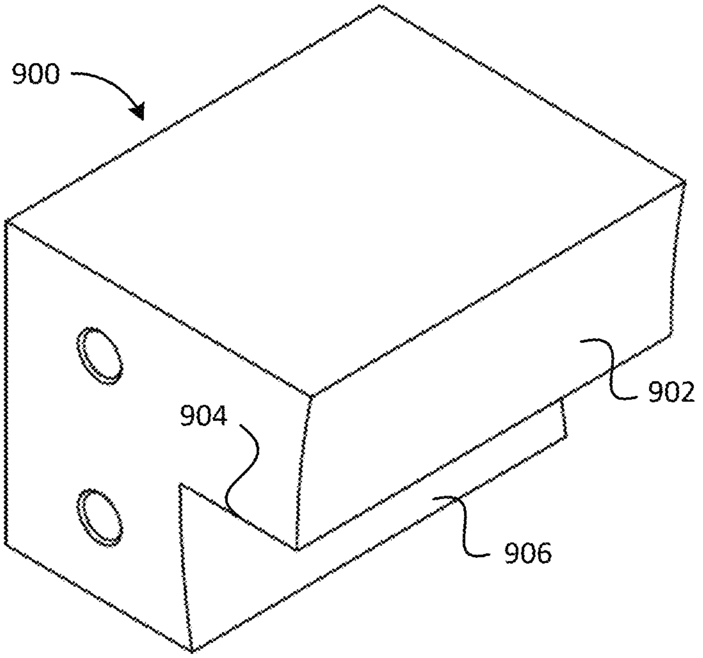
FIG. 9B illustrates a perspective view of the example piston that includes a two-dimensional curved surface.

FIG. 9A illustrates a side view of an example piston 900 that includes a two-dimensional curved surface. FIG. 9B illustrates a perspective view of the example piston 900 that includes a two-dimensional curved surface. The piston 900 can be used, for example, to implement the piston 104 included in the hydraulic actuator of FIGS. 1 and 2A-2C. As shown in the illustrated examples of FIGS. 9A and 9B, a first surface of the piston 900, or piston face, 902 is a curved surface that is curved in two dimensions. An indent, or step, 904 formed in the piston face 902 defines a second surface of the piston 900, or step face 906. The step face 906 is also a curved surface that is curved in two dimensions. In some examples, the radius of curvature of the piston face 902 and/or the radius of curvature of the step face 906 is between 70 mm and 120 mm.

When the piston 900 is implemented as piston 104 in the hydraulic actuator 100, the piston face 902 and the step face 906 are oriented to face in the direction of the base 112 of the cylinder 102. In that regard, an ultrasonic pulse emitted by the ultrasonic transducer 126 propagates, or travels, through hydraulic fluid in the first chamber 108 of the cylinder 102 towards the piston 900 until the ultrasonic pulse reflects off the piston face 902 and/or the step face 906 back towards the ultrasonic transducer 126. For example, the ultrasonic pulse reflects off the piston face 902 as a first echo that propagates back towards the ultrasonic transducer 126 and reflects off the step face 906 as a second echo that propagates back towards the ultrasonic transducer 126. When compared to ultrasonic echoes that are reflected off flat surfaces, the ultrasonic echoes reflected off the curved piston face 902 and the curved step face 906 have more reflective energy, thereby making the echoes easier to detect by the ultrasonic transducer 126.

Figure 10A:
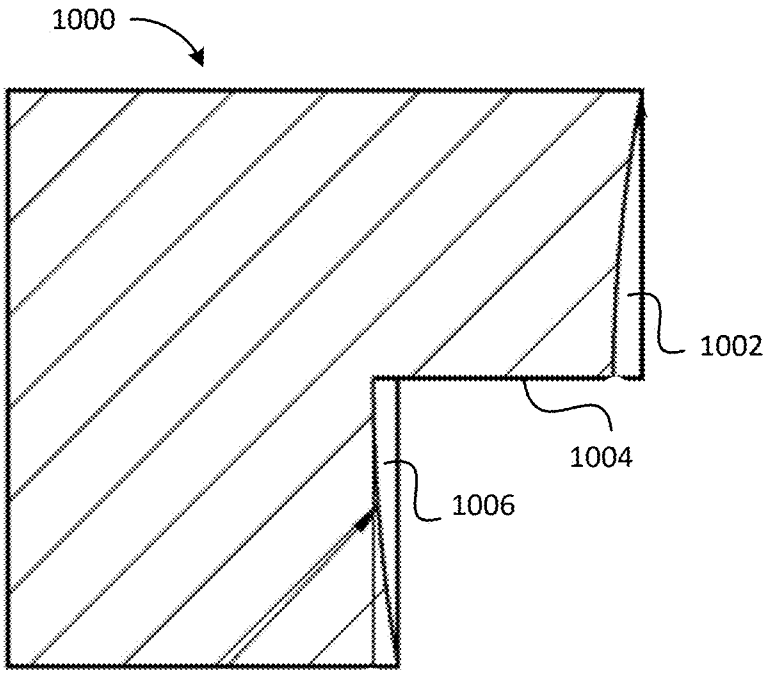
FIG. 10A illustrates a cross-section view of an example piston that includes a three-dimensional curved surface.
Figure 10B:
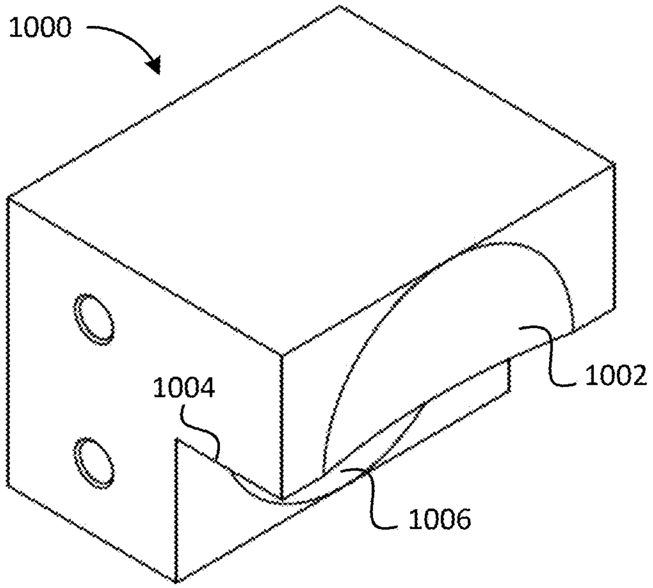
FIG. 10B illustrates a perspective view of the example piston that includes a three-dimensional curved surface.

FIG. 10A illustrates a cross section view of an example piston 1000 that includes a three-dimensional curved surface. FIG. 10B illustrates a perspective view of the example piston 1000 that includes a three-dimensional curved surface. The piston 1000 can be used, for example, to implement the piston 104 included in the hydraulic actuator of FIGS. 1 and 2A-2C. As shown in the illustrated examples of FIGS. 10A and 10B, a first surface of the piston 1000, or piston face, 1002 is a spherical surface that is curved in three dimensions. An indent, or step, 1004 formed in the piston face 1002 defines a second surface of the piston 1000, or step face 1006. The step face 1006 is also a spherical surface that is curved in three dimensions. In some examples, the radius of curvature of the piston face 1002 and/or the radius of curvature of the step face 1006 is between 70 mm and 120 mm.

When the piston 1000 is implemented as piston 104 in the hydraulic actuator 100, the piston face 1002 and the step face 1006 are oriented to face in the direction of the base 112 of the cylinder 102. In that regard, an ultrasonic pulse emitted by the ultrasonic transducer 126 propagates, or travels, through hydraulic fluid in the first chamber 108 of the cylinder 102 towards the piston 1000 until the ultrasonic pulse reflects off the piston face 1002 and/or the step face 1006 back towards the ultrasonic transducer 126. For example, the ultrasonic pulse reflects off the piston face 1002 as a first echo that propagates back towards the ultrasonic transducer 126 and reflects off the step face 1006 as a second echo that propagates back towards the ultrasonic transducer 126. When compared to ultrasonic echoes that are reflected off flat surfaces, the ultrasonic echoes reflected off the spherical piston face 1002 and the spherical step face 1006 have more reflective energy, thereby making the echoes easier to detect by the ultrasonic transducer 126.

Although certain aspects have been described with reference to certain examples, variations and modifications exist within the spirit and scope of one or more independent aspects. Various features and aspects are set forth in the following claims.

Any and all combinations of any of the claim elements recited in any of the claims and/or any elements described in this application, in any fashion, fall within the contemplated scope of the present disclosure and protection. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine.

The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A position detection system, comprising:

a hydraulic actuator including a cylinder and a piston adapted to move linearly within the cylinder, the piston having a first surface and a second surface that is displaced from the first surface by a known distance;

an ultrasonic transducer adapted to detect an ultrasonic signal indicative of a position of the piston within the cylinder; and a controller coupled to the ultrasonic transducer, the controller is adapted to:

receive the ultrasonic signal from the ultrasonic transducer;

implement a cross-correlation function to identify a first echo and a second echo in the ultrasonic signal;

determine a velocity of the first echo and the second echo;

determine whether a difference between the velocity of the first echo and the second echo and a theoretical velocity is less than a threshold; and in response to determining that the difference between the velocity of the first echo and the second echo and a theoretical velocity is less than a threshold, determine the position of the piston within the cylinder based in part on the known distance.

2. The position detection system of claim 1, wherein to generate the ultrasonic signal, the ultrasonic transducer is further adapted to emit an ultrasonic pulse in a first direction towards the piston.

3. The position detection system of claim 2, wherein the first echo is a reflection of the ultrasonic pulse off the first surface of the piston and the second echo is a reflection of the ultrasonic pulse off the second surface of the piston.

4. The position detection system of claim 1, wherein the controller is further adapted to:

determine a time of flight of the first echo based on the ultrasonic signal; and store the time of flight of the first echo in a memory.

5. The position detection system of claim 1, wherein to determine the position of the piston within the cylinder based in part on the known distance, the controller is further adapted to:

determine a time of flight of the first echo based on the ultrasonic signal;

determine a time shift between the first echo and the second echo based on the ultrasonic signal; and determine the position of the piston within the cylinder based on the known distance, the time of flight of the first echo, and the time shift between the first echo and the second echo.

6. The position detection system of claim 5, wherein in response to determining that the difference between the velocity of the first echo and the second echo and a theoretical velocity exceeds the threshold, the controller is further adapted to:

implement a Hilbert envelope method to identify the first echo and the second echo in the ultrasonic signal; and determine the position of the piston within the cylinder based on the known distance and at least one characteristic of the first echo and the second echo, the time of flight of the first echo, and the time shift between the first echo and the second echo.

7. The position detection system of claim 1, wherein to determine the velocity of the first echo and the second echo, the controller is further adapted to:

determine a time shift between the first echo and the second echo; and determine the velocity of the first echo and the second echo based on the known distance and the time shift between the first echo and the second echo.

8. The position detection system of claim 1, wherein the controller is further adapted to:

receive a second ultrasonic signal from the ultrasonic transducer;

implement the cross-correlation function to identify a first echo in the second ultrasonic signal and a second echo in the second ultrasonic signal;

determine at least one characteristic of the first echo in the second ultrasonic signal;

determine whether a difference between the at least one characteristic of the first echo in the second ultrasonic signal and a characteristic of the first echo in the ultrasonic signal passes a physical check; and in response to determining that the difference between the at least one characteristic of the first echo in the second ultrasonic signal and the characteristic of the first echo in the ultrasonic signal passes the physical check, determine an updated position of the piston within the cylinder based in part on the at least one characteristic of the first echo in the second ultrasonic signal.

9. The position detection system of claim 8, wherein the at least one characteristic of the first echo in the second ultrasonic signal is a time of flight of the first echo in the second ultrasonic signal.

10. The position detection system of claim 8, wherein in response to determining that the difference between the at least one characteristic of the first echo in the second ultrasonic signal and the characteristic of the first echo in the ultrasonic signal does not pass the physical check, the controller is further adapted to:

implement a Hilbert envelope method to identify the first echo in the second ultrasonic signal and the second echo in the ultrasonic signal;

determine at least one updated characteristic of the first echo in the second ultrasonic signal; and determine the updated position of the piston within the cylinder based in part on the known distance and the at least one updated characteristic of the first echo in the second ultrasonic signal.

11. A method for detecting the position of a piston within a cylinder of a hydraulic actuator, the method comprising:

providing the hydraulic actuator including the cylinder and the piston adapted to move linearly within the cylinder, the piston having a first surface and a second surface that is displaced from the first surface by a known distance, and an ultrasonic transducer adapted to detect an ultrasonic signal indicative of a position of the piston within the cylinder;

receiving, from the ultrasonic transducer, an ultrasonic signal indicative of the position of the piston within the cylinder;

implementing a cross-correlation function to identify a first echo and a second echo in the ultrasonic signal;

determining a velocity of the first echo or the second echo;

determining whether a difference between the velocity of the first echo or the second echo and a theoretical velocity is less than a threshold; and in response to determining that the difference between the velocity of the first echo or the second echo and a theoretical velocity is less than a threshold, determining the position of the piston within the cylinder based in part on a time shift between the first echo and the second echo in the ultrasonic signal.

12. The method of claim 11, wherein determining the position of the piston within the cylinder based in part on the time shift between the first echo and the second echo in the ultrasonic signal comprises:

determining a time of flight of the first echo based on the ultrasonic signal;

determining a known distance between the first surface of the piston off which the first echo was reflected and the second surface of the piston off which the second echo was reflected; and determining the position of the piston within the cylinder based on the time shift between the first echo and the second echo in the ultrasonic signal, the time of flight of the first echo, and the known distance.

13. The method of claim 11, further comprising in response to determining that the difference between the velocity of the first echo and the second echo and a theoretical velocity exceeds the threshold:

implementing a Hilbert envelope method to identify the first echo and the second echo in the ultrasonic signal; and determining the position of the piston within the cylinder based in part on a time shift between the first echo and the second echo that were identified in the ultrasonic signal with the Hilber envelope method.

14. The method of claim 11, wherein to generate the ultrasonic signal, the method further comprises:

emitting, via the ultrasonic transducer, an ultrasonic pulse in a first direction towards the piston;

detecting the first echo, wherein the first echo is a reflection of the ultrasonic pulse off the first surface of the piston; and detecting the second echo, wherein the second echo is a reflection of the ultrasonic pulse off the second surface of the piston.

15. The method of claim 11, further comprising:

determining a time of flight of the first echo based on the ultrasonic signal; and storing the time of flight of the first echo in a memory.

16. The method of claim 11, further comprising:

receiving a second ultrasonic signal from the ultrasonic transducer;

implementing the cross-correlation function to identify a first echo in the second ultrasonic signal and a second echo in the second ultrasonic signal;

determining at least one characteristic of the first echo in the second ultrasonic signal;

determining whether a difference between the at least one characteristic of the first echo in the second ultrasonic signal and a characteristic of the first echo in the ultrasonic signal passes a physical check; and in response to determining that the difference between the at least one characteristic of the first echo in the second ultrasonic signal and the characteristic of the first echo in the ultrasonic signal passes the physical check, determining an updated position of the piston within the cylinder based in part on the at least one characteristic of the first echo in the second ultrasonic signal.

17. The method of claim 16, wherein in response to determining that the difference between the at least one characteristic of the first echo in the second ultrasonic signal and the characteristic of the first echo in the ultrasonic signal does not pass the physical check, the method further comprises:

implementing a Hilbert envelope method to identify the first echo in the second ultrasonic signal and the second echo in the ultrasonic signal;

determining at least one updated characteristic of the first echo in the second ultrasonic signal; and determining the updated position of the piston within the cylinder based in part on the at least one updated characteristic of the first echo in the second ultrasonic signal.

18. A hydraulic actuator, comprising:

a cylinder having a base portion;

a piston adapted to move within an interior of the cylinder, the piston having a first surface and a second surface that is indented relative to the first surface by a known distance;

an ultrasonic transducer disposed on the base portion and adapted to detect an ultrasonic signal indicative of a position of the piston within the cylinder; and a controller coupled to the ultrasonic transducer, the controller is adapted to:

receive the ultrasonic signal from the ultrasonic transducer;

implement a cross-correlation function to identify a first echo and a second echo in the ultrasonic signal;

determine a velocity of the first echo and the second echo;

determine whether a difference between the velocity of the first echo and the second echo and a theoretical velocity is less than a threshold; and in response to determining that the difference between the velocity of the first echo and the second echo and a theoretical velocity is less than a threshold, determine a distance between the base portion and the first surface of the piston independent of a pressure or a temperature within the interior of the cylinder.

19. The hydraulic actuator of claim 18, wherein to determine the distance between the base portion and the first surface of the piston independent of the pressure or the temperature within the interior of the cylinder, the controller is further adapted to determine the distance between the base portion and the first surface of the piston based on the known distance.

20. The hydraulic actuator of claim 18, wherein the first echo is a reflection of an ultrasonic pulse off the first surface of the piston and the second echo is a reflection of the ultrasonic pulse off the second surface of the piston.

* * * * *